(12) United States Patent
Akhter et al.

(10) Patent No.: US 9,398,489 B1
(45) Date of Patent: *Jul. 19, 2016

(54) METHOD AND APPARATUS FOR CONTEXT BASED DATA COMPRESSION IN A COMMUNICATION SYSTEM

(71) Applicant: Integrated Device Technology, Inc., San Jose, CA (US)

(72) Inventors: Mohammad Shahanshah Akhter, Ottawa (CA); Brian Scott Darnell, Suwanee, GA (US); Steve Lamontagne, Ottawa (CA); Bachir Berkane, Ottawa (CA)

(73) Assignee: INTEGRATED DEVICE TECHNOLOGY

( * ) Notice: Subject to any disclaimer, the term of this patent is extended or adjusted under 35 U.S.C. 154(b) by 164 days.

This patent is subject to a terminal disclaimer.

(21) Appl. No.: 14/050,045

(22) Filed: Oct. 9, 2013

(51) Int. Cl.
H04W 28/06 (2009.01)
H04L 29/06 (2006.01)

(52) U.S. Cl.
CPC ............... *H04W 28/06* (2013.01); *H04L 69/04* (2013.01)

(58) Field of Classification Search
USPC ........................ 370/230, 477, 235, 230.1, 252
See application file for complete search history.

(56) References Cited

U.S. PATENT DOCUMENTS

| | | | |
|---|---|---|---|
| 5,999,561 A | 12/1999 | Naden et al. | |
| 6,192,259 B1 | 2/2001 | Hayashi | |
| 6,226,325 B1 | 5/2001 | Nakamura | |
| 6,240,084 B1 | 5/2001 | Oran et al. | |
| 6,263,503 B1 | 7/2001 | Margulis | |
| 6,449,596 B1 | 9/2002 | Ejima | |
| 6,728,778 B1 | 4/2004 | Brennan et al. | |
| 6,775,530 B2 | 8/2004 | Severson et al. | |

(Continued)

FOREIGN PATENT DOCUMENTS

| | | |
|---|---|---|
| KR | 1020080056360 A | 6/2008 |
| WO | 2005048625 A1 | 5/2005 |

(Continued)

OTHER PUBLICATIONS

CPRI Specification V4.1, Commmon Public Interface (CPRI); Interface Specification, Feb. 1, 2009, 75 pages.

(Continued)

*Primary Examiner* — Michael Thier
*Assistant Examiner* — Rownak Islam
(74) *Attorney, Agent, or Firm* — Glass & Associates; Molly Sauter; Kenneth Glass

(57) ABSTRACT

A dynamic context resource module measures a compression performance level of a most recent compressed data packet of each of a plurality of compressed signal streams to generate a signal stream compression performance level for each signal stream. Dynamic compression performance indicators are calculated from the measured signal stream compression performance levels and are stored in a dynamic context resource table. A compression parameter estimation module reads the dynamic compression performance indicators and determines if each signal stream exhibits a desired performance level. If a signal stream does not exhibit the desired performance level, the compression parameters for the signal stream are adjusted. A compressed packet generator compresses a next data packet of the signal stream based upon the adjusted compression parameters for the signal stream or the unadjusted compression parameters for the signal stream.

16 Claims, 11 Drawing Sheets

(56) References Cited

U.S. PATENT DOCUMENTS

| | | | |
|---|---|---|---|
| 6,842,623 B2 | 1/2005 | Koskal | |
| 6,903,668 B1 | 6/2005 | Drorr et al. | |
| 7,009,533 B1 | 3/2006 | Wegener | |
| 7,088,276 B1 | 8/2006 | Wegener | |
| 7,142,519 B2 | 11/2006 | Saadeh et al. | |
| 7,519,383 B2 | 4/2009 | Olgaard | |
| 7,529,215 B2 | 5/2009 | Osterling | |
| 7,541,950 B2 | 6/2009 | Wegener | |
| 7,564,861 B1 * | 7/2009 | Subbiah | H03M 7/30 370/428 |
| 7,599,283 B1 | 10/2009 | Varnier et al. | |
| 7,623,894 B2 | 11/2009 | Vaglica et al. | |
| 7,656,897 B2 | 2/2010 | Liu | |
| 7,680,149 B2 | 3/2010 | Liu et al. | |
| 7,706,477 B2 | 4/2010 | Larsson | |
| 7,835,435 B2 | 11/2010 | Soni et al. | |
| 7,852,797 B2 | 12/2010 | Kang et al. | |
| 7,899,410 B2 | 3/2011 | Rakshani et al. | |
| 7,924,949 B2 | 4/2011 | Larsson | |
| 7,930,436 B1 * | 4/2011 | Znosko | H04L 69/04 330/252 |
| 7,961,807 B2 | 6/2011 | Kotecha et al. | |
| 8,005,152 B2 | 8/2011 | Wegener | |
| 8,018,910 B2 | 9/2011 | Jiang et al. | |
| 8,054,889 B2 | 11/2011 | Isu et al. | |
| 8,089,854 B2 | 1/2012 | Persico | |
| 8,108,910 B2 | 1/2012 | Conner, II et al. | |
| 8,165,100 B2 | 4/2012 | Sabat et al. | |
| 8,174,428 B2 | 5/2012 | Wegener | |
| 8,176,524 B2 | 5/2012 | Singh et al. | |
| 8,239,912 B2 | 8/2012 | Deng | |
| 8,320,433 B2 | 11/2012 | Wegener et al. | |
| 8,331,461 B2 | 12/2012 | Wegener et al. | |
| 8,340,021 B2 | 12/2012 | Okeeffe et al. | |
| 8,649,388 B2 | 2/2014 | Wegener et al. | |
| 8,705,634 B2 | 4/2014 | Wegener | |
| 8,825,900 B1 | 9/2014 | Gross, IV et al. | |
| 8,989,088 B2 | 3/2015 | Ling | |
| 9,047,669 B1 * | 6/2015 | Ostiguy | G06T 9/005 |
| 9,055,472 B2 | 6/2015 | Evans et al. | |
| 9,059,778 B2 | 6/2015 | Ling | |
| 9,203,933 B1 | 12/2015 | Akhter et al. | |
| 9,215,296 B1 | 12/2015 | Akhter et al. | |
| 9,240,803 B2 | 1/2016 | Wegener | |
| 2002/0055371 A1 | 5/2002 | Amon et al. | |
| 2002/0136296 A1 * | 9/2002 | Stone | H04N 19/176 375/240.03 |
| 2002/0163965 A1 | 11/2002 | Lee et al. | |
| 2003/0100286 A1 | 5/2003 | Severson et al. | |
| 2003/0215105 A1 * | 11/2003 | Sacha | H04R 25/505 381/312 |
| 2004/0004943 A1 | 1/2004 | Kim | |
| 2004/0062392 A1 | 4/2004 | Morton | |
| 2004/0082365 A1 | 4/2004 | Sabach et al. | |
| 2004/0198237 A1 | 10/2004 | Abutaleb et al. | |
| 2004/0218826 A1 * | 11/2004 | Terao | G06T 9/007 382/240 |
| 2005/0104753 A1 | 5/2005 | Dror et al. | |
| 2005/0105552 A1 | 5/2005 | Osterling | |
| 2005/0134907 A1 | 6/2005 | Obuchi et al. | |
| 2005/0169411 A1 | 8/2005 | Kroeger | |
| 2006/0159070 A1 | 7/2006 | Deng | |
| 2006/0233446 A1 | 10/2006 | Saito et al. | |
| 2007/0054621 A1 | 3/2007 | Larsson | |
| 2007/0070919 A1 | 3/2007 | Tanaka et al. | |
| 2007/0076783 A1 | 4/2007 | Dishman et al. | |
| 2007/0116046 A1 | 5/2007 | Liu et al. | |
| 2007/0149135 A1 | 6/2007 | Larsson et al. | |
| 2007/0160012 A1 | 7/2007 | Liu | |
| 2007/0171866 A1 | 7/2007 | Merz et al. | |
| 2007/0293180 A1 | 12/2007 | Rahman et al. | |
| 2008/0018502 A1 | 1/2008 | Wegener | |
| 2008/0022026 A1 | 1/2008 | Yang et al. | |
| 2008/0025298 A1 * | 1/2008 | Lev-Ran | H04L 69/04 370/389 |
| 2009/0092117 A1 | 4/2009 | Jiang et al. | |
| 2009/0149221 A1 | 6/2009 | Liu et al. | |
| 2009/0265744 A1 | 10/2009 | Singh et al. | |
| 2009/0290632 A1 | 11/2009 | Wegener | |
| 2010/0067366 A1 | 3/2010 | Nicoli | |
| 2010/0177690 A1 | 7/2010 | O'Keeffe et al. | |
| 2010/0202311 A1 | 8/2010 | Lunttla et al. | |
| 2010/0246642 A1 | 9/2010 | Walton et al. | |
| 2010/0285756 A1 | 11/2010 | Nakazawa | |
| 2011/0280209 A1 | 11/2011 | Wegener | |
| 2012/0008696 A1 | 1/2012 | Wegener | |
| 2012/0014421 A1 | 1/2012 | Wegener | |
| 2012/0014422 A1 | 1/2012 | Wegener | |
| 2012/0057572 A1 | 3/2012 | Evans | |
| 2012/0183023 A1 | 7/2012 | Filipovic et al. | |
| 2012/0202507 A1 | 8/2012 | Zhang et al. | |
| 2012/0207206 A1 | 8/2012 | Samardzija et al. | |
| 2012/0250740 A1 | 10/2012 | Ling | |
| 2012/0307842 A1 | 12/2012 | Petrov et al. | |
| 2012/0327956 A1 * | 12/2012 | Vasudevan | H04L 67/1097 370/477 |
| 2012/0328121 A1 | 12/2012 | Truman et al. | |
| 2014/0208069 A1 | 7/2014 | Wegener | |
| 2015/0092881 A1 | 4/2015 | Hwang et al. | |

FOREIGN PATENT DOCUMENTS

| | | |
|---|---|---|
| WO | 2005062494 A1 | 7/2005 |
| WO | 2008152455 A1 | 12/2008 |
| WO | 2009143176 A2 | 11/2009 |
| WO | 2009/151893 | 12/2009 |
| WO | 2011/135013 | 11/2011 |

OTHER PUBLICATIONS

OBSAI Open base Station Architecture Initiative BTS System Reference document Ver. 2.0, Apr. 27, 2006, 151 pages.

OBSAI Open Base Station Architecture Initiative Reference Point 3 Specification Ver. 4.0, Mar. 7, 2007, 119 pages.

K. I. Pendersen. "Frequency domain scheduling for OFMA with limited and noisy channel feedback " 2007 IEEE 66th Vehicular Technology Conference. pp. 1792-1796, Oct. 3, 2007., see section II. C.

Maruyama, S. et al., "Base Transceiver Station for W-CDMA System," Fujitsu Sci. Tech. J. 38,2, p. 167-73, Dec. 2002.

CPRI Specification V3.0 Common Public Radio Interface (CPRI), Interface Specification. Ericsson Ab, huawei Technologies Col ltd, NEC Corporation, Nortel Networks SA and Siemens Networks BmbH & Co., Oct. 2, 2006, 89 Pages.

* cited by examiner

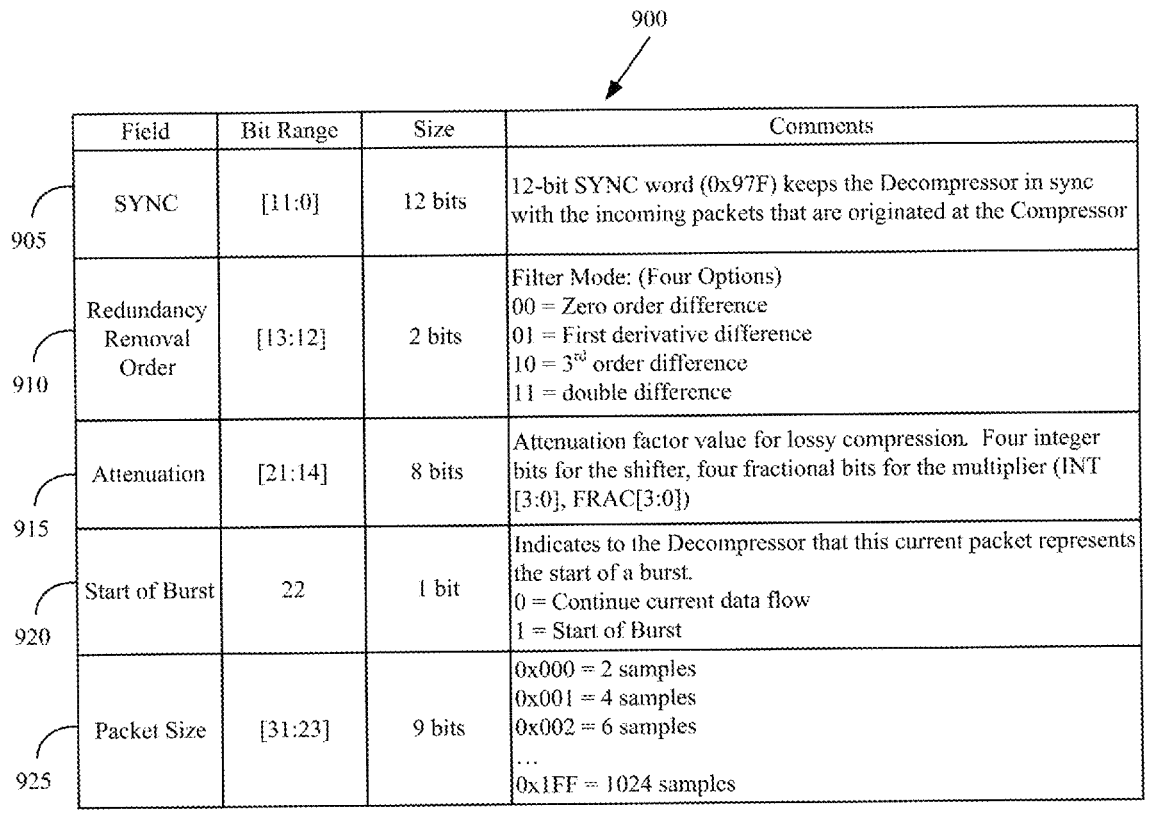

| Field | Bit Range | Size | Comments |
|---|---|---|---|
| SYNC | [11:0] | 12 bits | 12-bit SYNC word (0x97F) keeps the Decompressor in sync with the incoming packets that are originated at the Compressor |
| Redundancy Removal Order | [13:12] | 2 bits | Filter Mode: (Four Options)<br>00 = Zero order difference<br>01 = First derivative difference<br>10 = 3$^{rd}$ order difference<br>11 = double difference |
| Attenuation | [21:14] | 8 bits | Attenuation factor value for lossy compression. Four integer bits for the shifter, four fractional bits for the multiplier (INT[3:0], FRAC[3:0]) |
| Start of Burst | 22 | 1 bit | Indicates to the Decompressor that this current packet represents the start of a burst.<br>0 = Continue current data flow<br>1 = Start of Burst |
| Packet Size | [31:23] | 9 bits | 0x000 = 2 samples<br>0x001 = 4 samples<br>0x002 = 6 samples<br>...<br>0x1FF = 1024 samples |

Fig. 9

# METHOD AND APPARATUS FOR CONTEXT BASED DATA COMPRESSION IN A COMMUNICATION SYSTEM

BACKGROUND OF THE INVENTION

Transceiver systems in wireless communication networks perform the control functions for directing signals among communicating subscribers, or terminals, as well as communication with external networks. Transceiver systems in wireless communications networks include radio base stations and distributed antenna systems (DAS). For the reverse link, or uplink, a terminal transmits the RF signal received by the transceiver system. For the forward link, or downlink, the transceiver system transmits the RF signal to a subscriber, or terminal, in the wireless network. A terminal may be fixed or mobile wireless user equipment unit (UE) and may be a wireless device, cellular phone, personal digital assistant (PDA), personal computer or other device equipped with a wireless modem.

The rapid increase in data (e.g., video) communication and content consumption has led to expansion of wireless communication networks. As a result, the introduction of next generation communication standards (e.g., 3GPP LTE-A, IEEE 802.16m) has led to improved techniques for data processing, such as carrier aggregation (e.g., 100 MHz) with 8×8 MIMO (Multiple-Input, Multiple-Output) and CoMP (Co-Operative Multi-Point). This in turn has created the need for radio access networks capable of handling wider bandwidths and an increasing number of antennas. These radio access networks will require a higher numbers of fiber links to connect the base stations to the remote radio units. In addition, it is desirable to provide carrier aggregation with Multiple-Input and Multiple-Output (MIMO) and Co-Operative Multipoint (CoMP) techniques to significantly increase spectral efficiency. The implementation of Co-Operative Multipoint techniques requires communication between the baseband units and requires an increasing number of optical or wireless links between the baseband units and the radio units to support the increased data rate achievable with these improved transmission schemes. The increasing number of links required for these techniques results in an undesirable increased infrastructure cost.

Compression techniques can be used to reduce the infrastructure cost by reducing the number of optical or wireless links required to transmit the data as well as by optimizing resources. However, utilizing the compression techniques currently known in the art, it is difficult to achieve an average compression ratio with reasonable signal degradation while also keeping the latency jitter low. Compression techniques known in the art are unable to adjust to the continually changing signal behavior and as such, suffer from very high latency jitter.

While there are compression techniques currently known in the art to improve the data transmission rate of the communication system, the existing compression techniques utilize predetermined compression parameters that do not address the changing signal behavior of the received signals. As such, it is difficult for the known compression techniques to achieve an average compression ratio with reasonable degradation when the signal behavior changes rapidly.

In addition, carrier aggregation employing 8×8 Multiple Input Multiple Output (MIMO) and Coordinated Multipoint (CoMP) transmission are important techniques under consideration in next generation communications standards, such as Third Generation Partnership Project (3GPP) Advanced Long Term Evolution (LTE-A) and IEEE 802.16m. The data rate of these next generation communication standards is significantly higher and would greatly benefit from an improved compression scheme.

Accordingly, there is a need for a method and apparatus for data compression in a communication system that employs carrier aggregation and that adapts to the continually changing behavior of the received data signal over time, thereby providing a compressed data signal having a reasonable level of latency jitter and an acceptable level of performance degradation.

SUMMARY OF THE INVENTION

The present invention includes a method and apparatus that dynamically adjusts the compression parameters of individual signal streams based on the content of each individual signal stream.

In one embodiment of the present invention a dynamic context resource module is coupled to a compressor that compresses a plurality of signal streams based upon at least one compression parameter of each signal stream. The dynamic context resource module is configured to identify the performance level of a most recent compressed data packet of each of the plurality of compressed signal streams. The dynamic context resource module is configured to calculate one or more dynamic compression performance indicators from the signal stream compression performance level for each of the plurality of signal streams. The dynamic context resource module further includes a dynamic context resource table to store the one or more dynamic compression performance indicators.

The system includes a compression parameter estimation module coupled to the dynamic context resource module that is operable to determine if the most recent compressed data packet of each of the plurality of compressed signal streams exhibits a desired performance level based upon the one or more dynamic compression performance indicator. The compression parameter estimation module is further configured to adjust one or more compression parameters of each signal stream that does not exhibit the desired performance to generate at least one adjusted compression parameter for the signal stream. The compression parameter estimation module is additionally configured to not adjust one or more compression parameters associated with each of the signal streams that do exhibit the desired performance level.

In one embodiment the system includes a compressed data packet generator coupled to the compression parameter estimation module. The compressed data packet generator is operable to compress a next data packet of the signal stream using the corresponding one or more adjusted compression parameter for the signal stream if the signal stream does not exhibit the desired performance level and to compress a next data packet of the signal stream using the one or more unadjusted compression parameter for the signal stream if the signal stream does exhibit the desired performance level.

A method for compressing data in a communication system includes compressing multiple stream uncompressed data comprising an aggregated plurality of signal streams based upon one or more compression parameters associated with each of the plurality of signal streams, each of the plurality of signal streams comprising one or more compressed data packets. The method further includes measuring a compression performance level of a most recent compressed data packet of each of the plurality of compressed signal streams to generate a signal stream compression performance level for each of the plurality of signal streams. After the signal stream compression performance level is generated for each of the plurality of signal streams, the method further includes calculating one or more dynamic compression performance indicators from the signal stream compression performance level for each of the plurality of signal streams. The method continues by determining if each of the plurality of signal streams exhibits the desired performance level based upon the one or more dynamic compression performance indicators. Following determining if each of the plurality of signal streams exhibits the desired performance level based upon the one or more dynamic compression performance indicators, the method continues by adjusting the one or more compression parameters associated with each of the signal streams that does not exhibit the desired performance level or not adjusting the one or more compression parameters associated with each of the signal streams that does exhibit the desired performance level. After the one or more compression parameters have been adjusted or not adjusted, the method continues by compressing a next data packet of each of the plurality of signal streams based upon the adjusted one or more compression parameters associated with each of the signal streams or the unadjusted one or more compression parameters associated with each of the signal streams.

The method of the present invention then continues by repeatedly measuring a compression performance level of a next most recent compressed data packet of each of the plurality of compressed signal streams to generate a signal stream compression performance level for each of the plurality of signal streams, calculating one or more dynamic compression performance indicators from the signal stream compression performance level for each of the plurality of signal streams and adjusting or not adjusting the one or more compression parameters associated with each of the signal streams based upon whether or not the signal streams exhibit the desired performance level.

With the system and method of the present invention, multiple stream uncompressed data comprising a plurality of signal streams, as is commonly seen in a communication system employing carrier aggregation, is efficiently compressed. With the present invention, the performance level of the most recent compressed data packet of each of the plurality of signal streams of the multiple stream uncompressed data is monitored to determine if the compression of the signal stream exhibits a desired performance level. If the most recent compressed data packet does not meet the desired performance level, the compression parameters associated with the signal stream comprising the data packet are adjusted such that the signal stream meets the desired performance level, prior to compression of the next data packet of the signal stream.

Additionally, with the compressor of the present invention, a single compressor can be used to efficiently compress multiple stream uncompressed data that includes a plurality of signal streams. In the present invention, each of the signal streams may be associated with a different wireless protocol, including, but not limited to CDMA (Code Division Multiple Access) and LTE (Long Term Evolution). As a result of the variation in wireless protocols used for the individual signal streams, it may be advantageous to use different compression parameters during the compression of each of the individual signal streams. The compression performance of the compressor is improved by identifying and utilizing unique compression parameters for each of the individual signal streams. The present invention determines unique compression parameters for each of the signal streams such that the compression performance of each signal stream can be individually controlled by adjusting the compression parameters for each of the signal streams based upon the specific signal stream compression performance level. This is in contrast with the prior art, in which the same compression parameters are used to compress the data packets of all of the signals streams and the compression parameters do not take into account the unique characteristics of each signal stream or the real-time compression performance of the individual signal streams. Moreover, the method and apparatus of the present invention reduces bandwidth while maintaining low latency and low latency jitter.

BRIEF DESCRIPTION OF DRAWINGS

FIG. 9 is a diagram illustrating a packet header format in accordance with an embodiment of the present invention.

DESCRIPTION OF THE INVENTION

The modular design approach for radio transceiver systems, wherein the baseband processing is separated from the radio frequency processing, has led the industry to develop interface standards. One example of a standard interface for the data transfer interfaces between the radio units and baseband units of transceiver systems is the Common Public Radio Interface (CPRI). Connection topologies between the baseband unit and one or more remote radio units include point-to-point, multiple point-to-point, chain, star, tree, ring and combinations thereof. Another example of an interface specification for modular architecture of radio transceiver systems is the Open Base Station Architecture Initiative (OBSAI). The OBSAI specification describes alternative protocols for the interconnection of baseband modules and remote radio units analogous to the CPRI specification, as well as data transfer protocols for the serial data links.

In conventional cellular communication systems, radio coverage is provided for a given geographic area via multiple base stations distributed throughout the geographic area involved. In this way, each base station can serve traffic in a smaller geographic area. Consequently, multiple base stations in a wireless communication network can simultaneously serve users in different geographic areas, which increases the overall capacity of the wireless network involved.

In order to further increase the capacity of wireless systems, each base station may be configured to support radio coverage in multiple sectors. For example, a base station in a conventional cellular system may be configured to provide radio coverage in one sector, three sectors or six sectors. In those systems employing multiple sectors per base station, each sector can handle part of the traffic in an additional smaller geographic area, which increases the overall capacity of the wireless network involved. Each of the sectors may include multiple remote radio units in communication with each of the base stations. Each of the radio units may further include multiple antennas for both receiving and transmitting data between the radio unit and the user of the communication system.

As described, communication systems are known in the art to include a baseband unit for performing signal processing in communication with a remote radio unit for receiving and transmitting signals to an antenna. The present invention provides a method and apparatus for an efficient compression solution implemented in a data compressor of a communication system.

Figure 1:
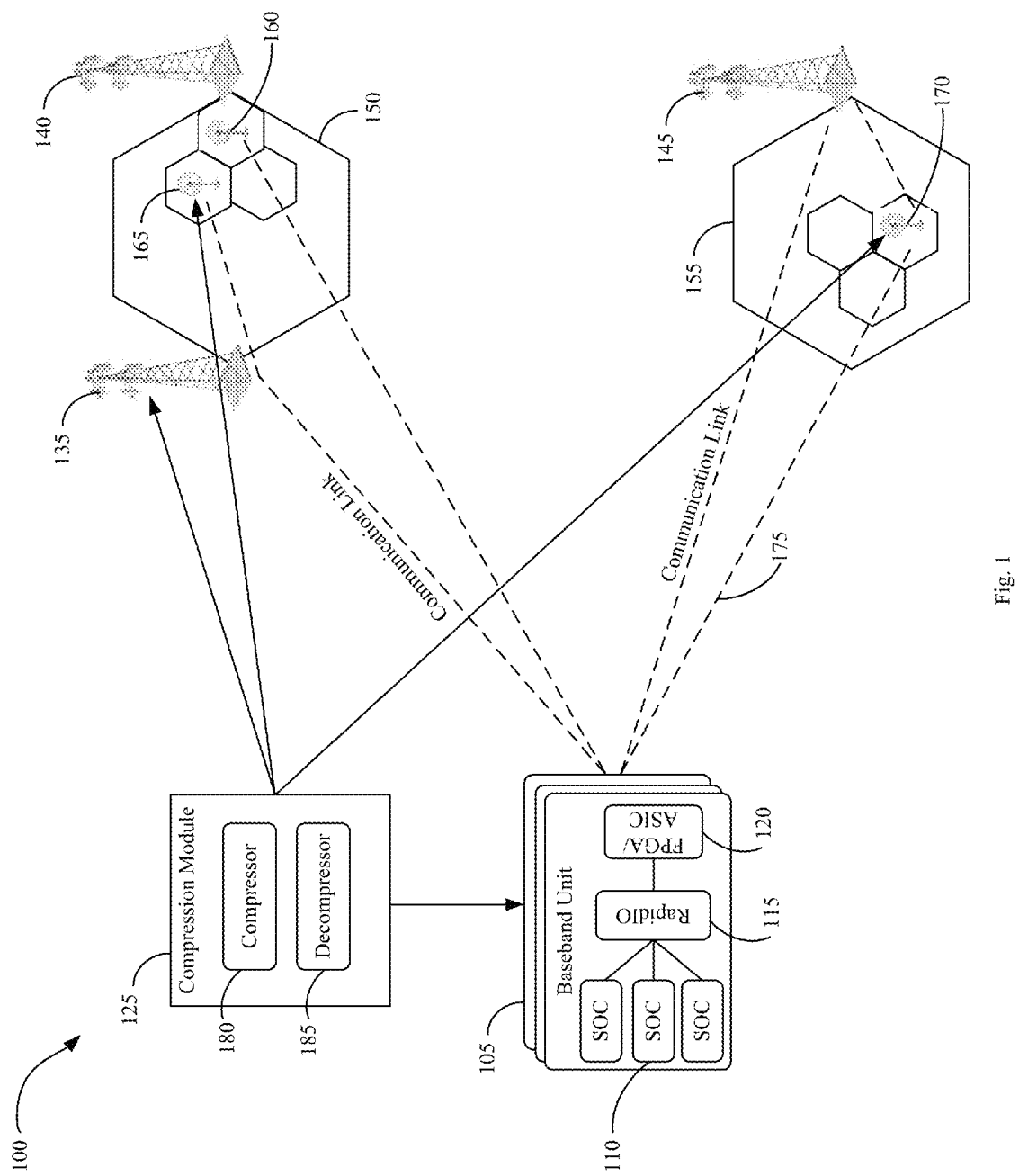
FIG. 1 is an illustration of a communication system architecture in accordance with an embodiment of the present invention.

FIG. 1 illustrates a typical usage of compression and decompression in a radio access network communication system 100. In a centralized radio access network communication system 100, remote radio units 135, 140, 145, 160, 165, 170 may include one or more antennas that may be used to transmit radio frequency data to a user or to receive radio frequency data from a user. Each of the remote radio units is responsible for providing a communication signal within a predetermined coverage area 150, 155. In a particular embodiment, the coverage area may be defined by a macro cell with a small cell overlay. The remote radio units 135, 140, 145, 160, 165, 170 may be coupled to a baseband unit 105 and to each other through a communication link 175. The communication link 175 may be a wireless, wired or optical link. In a particular embodiment, the connection may be a wired CPRI link. The baseband unit 105 may include a plurality of baseband cards and each baseband card may further include a control processor 110 implemented in an SOC (System on a Chip) additional signal processing circuitry 120 implemented in an FPGA or ASIC and a RapidIO interface 115 between the control processor 110 and the signal processing circuitry 120. The control circuit and signal processing circuitry may perform signal processing functions to modulate communication data that were extracted from previously received wireless signals or signals received from an external network to produce digital signals. The signal processing functions depend on the modulation format and can include symbol modulation, channel coding, spreading for CDMA, diversity processing for transmission, time and frequency synchronization, upconverting, multiplexing, and inverse fast Fourier transformation for OFDM. A compression module 125 may be implemented within the baseband unit 105 and/or at one or more of the remote radio units 135, 140, 145, 160, 165, 170. The compression module 125 may include both a compressor 180 and a decompressor 185. The compression module 125 is responsible for compressing the signal samples to be transmitted over the communication link 175 and for decompressing the received signal after transmission over the communication link 175. The compressor 180 and decompressor 185 may be integrated into one circuit, or the compressor 180 and decompressor 185 may be separate circuits.

In a particular embodiment, the signal samples may be compressed at the baseband unit 105 prior to being transmitted to one or more of the remote radio units 135, 140, 145, 160, 165, 170, where the compressed signal samples are then decompressed. Alternatively, the signal samples may also be compressed at the remote radio unit 135, 140, 145, 160, 165, 170, prior to being transmitted to the baseband unit 105, where the compressed signal samples are then decompressed.

In the present invention, the compressor 180 is used to compress the signal samples prior to transmission over the communication link 175 to increase the data throughput of the communication system. Compressing the data prior to transmission over the wireless link also allows for a reduction in the number of antennas that are necessary to transmit the signal samples between the baseband unit 105 and the remote radio units 135, 140, 145, 160, 165, 170.

The radio units 135, 140, 145, 160, 165, 170 may be operating in the same sector or in different sectors. In operation, the radio units 135, 140, 145, 160, 165, 170 may receive data from the baseband unit 105, or from another one of the radio units 135, 140, 145, 160, 165, 170.

In a communication system operating in an uplink mode, radio frequency data is received from a user at an antenna associated with a remote radio unit 135, 140, 145, 160, 165, 170 to be transmitted to a baseband unit 105. The radio frequency data received at the remote radio unit is sampled and converted to digital data and additional data processing may be applied to the data at the radio unit 135, 140, 145, 160, 165, 170. The data is then compressed at the compression module 125 of the radio unit 135, 140, 145, 160, 165, 170 and then transmitted from the radio unit 135, 140, 145, 160, 165, 170 to the baseband unit 105 for further processing.

In a communication system operating in a downlink mode, data may be transmitted from the baseband unit 105 to a remote radio unit 135, 140, 145, 160, 165, 170 for subsequent transfer of the data to a user via an antenna in communication with the remote radio unit 135, 140, 145, 160, 165, 170. The signal samples received at the baseband unit 105 are converted to digital data and additional data processing may be applied to the signal samples at the baseband unit 105. The signal samples are then compressed at the compression module 125 of the baseband unit 105 and then transmitted from the baseband unit 105 to one or more of the remote radio units 135, 140, 145, 160, 165, 170 for further processing.

Figure 2:
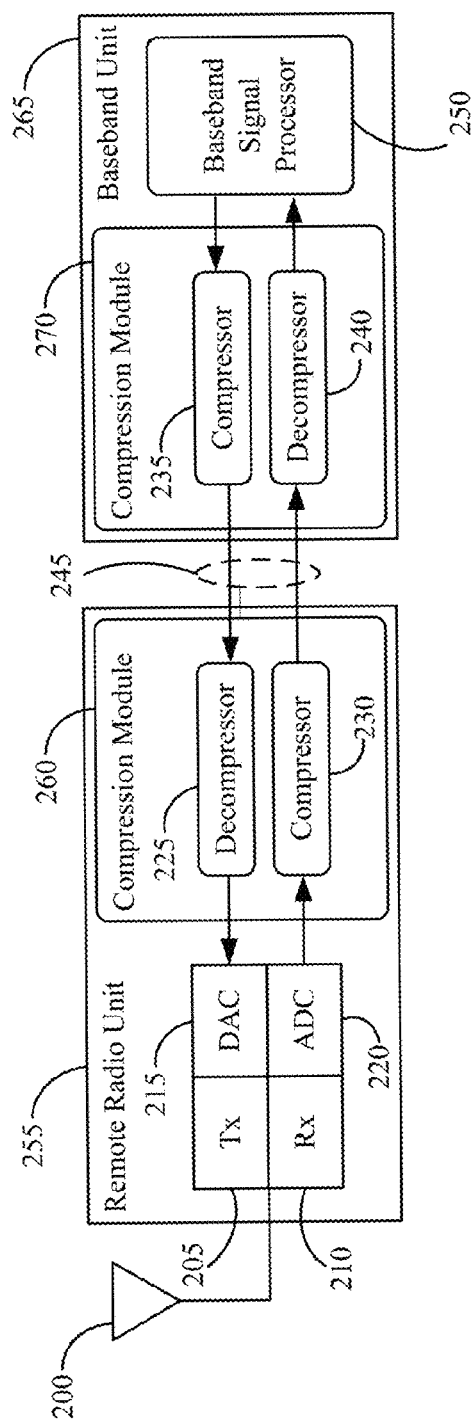
FIG. 2 is a block diagram illustrating a general base station architecture that incorporates compression and decompression.

FIG. 2 is a block diagram illustrating a communication system architecture that incorporates compression and decompression. With reference to FIG. 2, the communication system architecture includes a baseband unit 265 connected by one or more serial communication links 245 to a remote radio unit 255. This general architecture can be used for any air interface standard employed by wireless communication networks, including GSM/EDGE, CDMA based modulation formats, OFDM base modulation formats such as WiMax and other signal modulation formats that may evolve. The remote radio unit 255 may be located near the antenna 200 on an antenna tower. The remote radio unit 255 may be connected to multiple antennas for transmission, reception, diversity or beamforming. The serial communication link 245 may be implemented by fiber optic, coaxial cable or RJ-45 twisted pair. The baseband unit 265 performs signal processing functions to prepare data for transmission by the remote radio unit 255 or recovers data from signal samples received from the remote radio unit 255. The signal processing functions performed by the baseband unit 254 may include symbol modulation/demodulation, channel coding/decoding, spreading/ de-spreading for CDMA, diversity processing for transmission/reception, interference cancellation, equalization, time and frequency synchronization, upconverting/ downconverting, multiplexing/demultiplexing and data transport to/from an external network.

For the transmit path, or downlink, the baseband signal processor 250 of the baseband unit 265 performs the signal processing functions to modulate communication data that were extracted from previously received wireless signals or received from an external network to produce digital signals. The signal processing functions depend on the modulation format and can include symbol modulation, channel coding, spreading for CDMA, diversity processing for transmission, time and frequency synchronization, upconverting, multiplexing and inverse discrete Fourier transformation for OFDM. The compressor 235 of the compression module 270 compresses the samples of the digital signal prior to transfer over a communication link 245 to the remote radio unit 255. At the remote radio unit 255, the decompressor 225 of the compression module 260 decompresses the compressed samples to reconstruct the digital signal before digital to analog conversion. The digital to analog converter (DAC) 215 of the remote radio unit 255 converts the reconstructed digital signal to an analog signal. The transmitter (Tx) 205 prepares the analog signal for transmission by the antenna 200, including up-conversion to the appropriate radio frequency, RF filtering and amplification.

For the receive path, or uplink, antenna 200 at the remote radio unit 255 receives an RF analog signal representing modulated communication data from one or more wireless sources, or subscribers. The frequency band of the received signal may be a composite of transmitted signals from multiple wireless subscribers. Depending on the air interface protocol, different subscriber signals can be assigned to certain frequency channels or multiple subscribers can be assigned to a particular frequency band. The receiver (Rx) 210 of the remote radio unit 255 performs analog operations of the RF analog signal, including RF filtering, amplification and down-conversion to shift the center frequency of the received signal. The analog to digital converter (ADC) 220 of the remote radio unit 255 converts the received analog signal to a digital signal to produce signal samples that have only real values, or alternatively, have in phase (I) and quadrature (Q) components, based upon the system design. The compressor 230 of the remote radio unit 255 applies compression to the digital signal samples before transmission over the communication link 245. At the baseband unit 265, the decompressor 240 of the compression module 270 decompresses the compressed samples to reconstruct the digital signal prior to performing the normal signal processing at the baseband signal processor 250 to recover communication data from the decompressed digital signal. The processing operations may include demodulating symbols, channel decoding, dispreading (for CDMA modulation formats), diversity processing, interference cancelling, equalizing, time and frequency synchronization, downconverting, demultiplexing, discrete Fourier transformation (for OFDM modulation formats) and transporting data derived from the decompressed signal samples to an external network.

Figure 3:
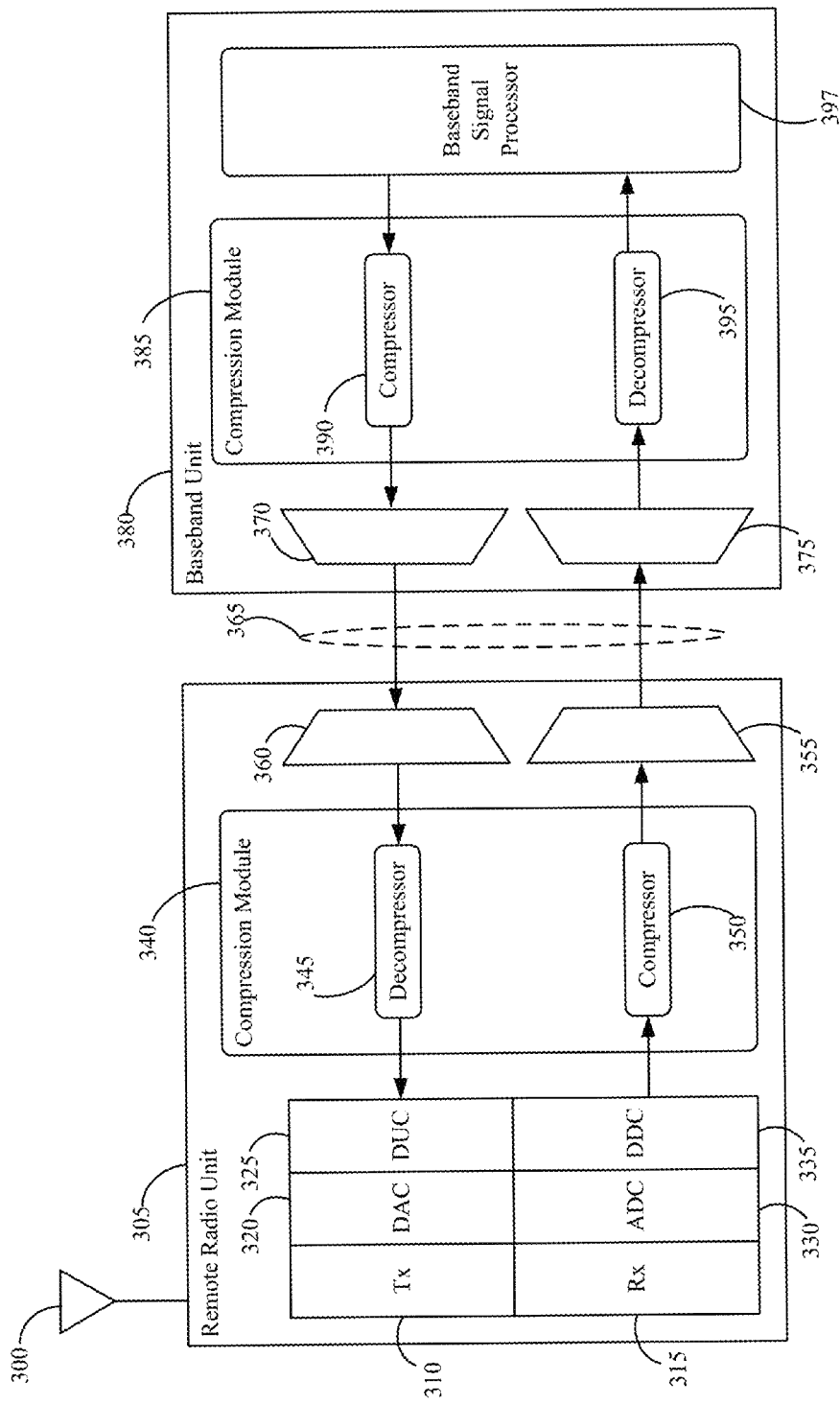
FIG. 3 is a block diagram illustrating compression and decompression where multiple signal channels are compressed and multiplexed before transfer over a communication link.

FIG. 3 is a block diagram of compression and decompression in accordance with the present invention, wherein multiple signal channels are compressed and multiplexed before transfer over a communication serial data link. Both OBSAI and CPRI transceivers may receive and transmit multiple frequency channels of signal samples for each independent antenna, or multiple antenna-carriers. With reference to FIG. 3, there are four channels of signal samples representing four antenna-carriers. The signal samples comprise baseband I and Q samples. For the transmit path, the compressor 390 of the compression module 385 at the baseband unit 380 independently compresses a stream of baseband I,Q signal samples to form corresponding streams of compressed samples. The multiplexer 370 multiplexes the streams compressed samples into a single serial data stream for transfer over serial data communication link 365 in accordance with the standard. At the remote radio unit 305, the demultiplexer 360 demultiplexes the serial data stream to recover the four streams of compressed samples in accordance with the standard. At the remote radio unit 305, the decompressor 345 of the compression module 340 decompresses one stream of compressed samples to reconstruct the corresponding baseband I,Q signal samples. The digital upconverter (DUC) 325 of the remote radio unit 305 upconverts each stream of decompressed signal samples to respective carrier frequencies to form a channelized signal. Each upconverted digital signal may occupy a particular channel of the resulting channelized signal. The digital to analog converter (DAC) 320 of the remote radio unit 305 converts the channelized signal to an analog signal. The transmitter 310 of the remote radio unit 305 converts the analog signal to the appropriate RF frequency for transmission by the antenna 300.

Additionally, with reference to FIG. 3, for the receive path, the receiver (Rx) 315 of the remote radio unit 305 receives the RF signal and the ADC 330 digitizes the received signal to produce a digital signal that represents a channelized signal data as previously described for the transmit path. The digital down converter (DDC) 335 of the remote radio unit downconverts each channel to form corresponding streams of baseband I,Q signal samples, one for each channel. The compressor 350 of the compression module 340 compress the received signal samples to form compressed samples. The multiplexer 355 multiplexes the streams of compressed samples output from the compressors 350 to form a serial data stream in accordance with the OBSAI or CPRI standards. The serial data stream is transferred via the serial data communication link 365 to the baseband unit 380. The demultiplexer 375 at the baseband unit 380 demultiplexes the serial data to restore the four streams of compressed samples. The decompressor 395 of the compression module 385 reconstructs the corresponding I,Q signal samples prior to performing normal operations by the baseband signal processor 397.

Figure 4:
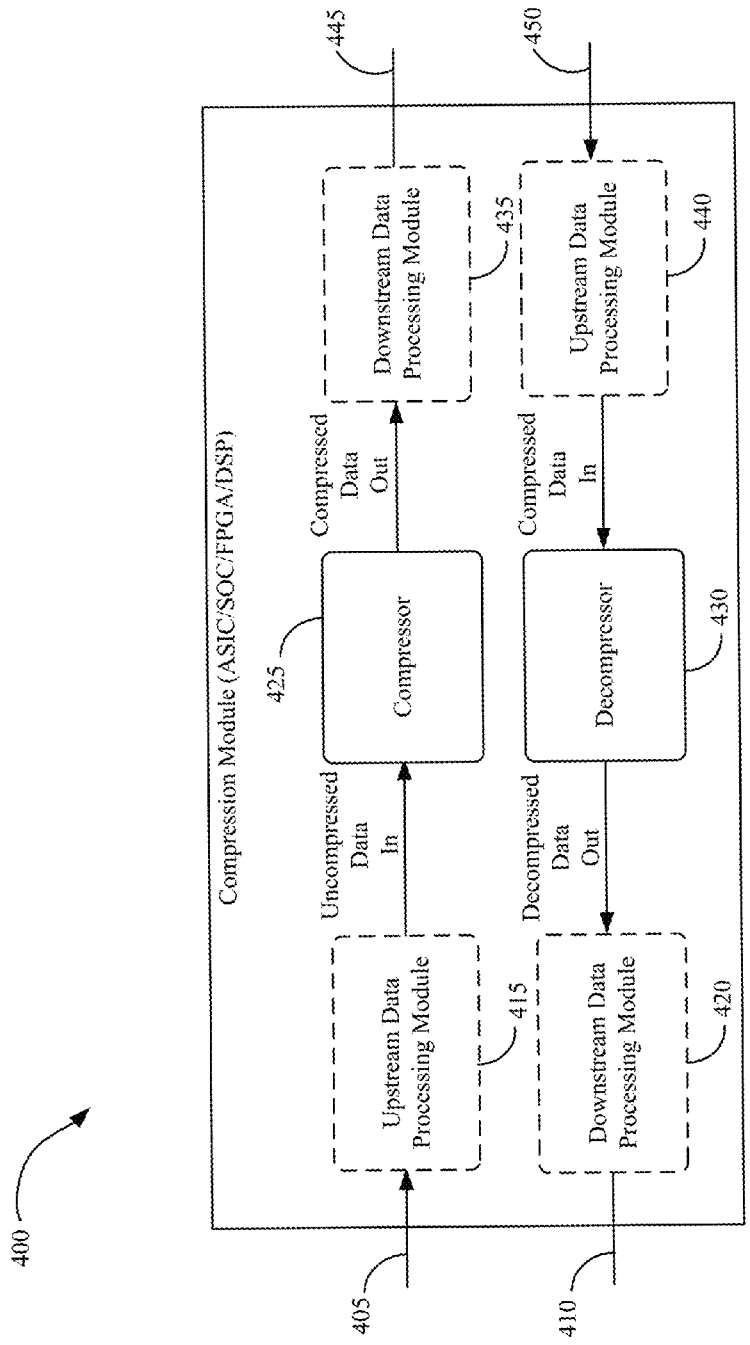
FIG. 4 is a block diagram illustrating a compression module that includes compressor and a decompressor in accordance with an embodiment of the present invention.

With reference to FIG. 4, a compression module 400 in accordance with the present invention may be implemented in an ASIC, SOC, FPGA or DSP, as previously described. The compression module 400 may be located at the baseband unit or alternatively at one or more of the remote radio units. In an additional embodiment, a compression module 400 may be located at both the baseband unit and at one or more of the remote radio units. The compression module 400 may include a compressor 425, a decompressor 430, one or more upstream data processing modules 415, 440 and one or more downstream processing modules 420, 435.

In a particular embodiment, the compression module is located at the baseband unit. In a downlink mode of operation, signal samples 405 to be transmitted to one or more of the remote radio units may be processed at the baseband unit. The compression module 400 at the baseband unit may preprocess the signal data utilizing an upstream data processing module 415. The preprocessed data from the upstream data processing module 415 may then be transmitted to a compressor 425. The compressor 425 may then compress the signal data and provide the compressed signal data to a downstream data processing module 435 for additional processing prior to transmitting the compressed signal 445 to the remote radio units. In an uplink mode of operation, compressed signal data 450 may be received at the compression module 400 located at the baseband unit from one or more of the remote radio units. An upstream data processing module 440 may preprocess the compressed signal data received from the remote radio units prior to providing the compressed data to the decompressor 430 of the baseband unit. The decompressor 430 may then decompress the compressed signal data. The decompressed signal data may then be provided to a downstream data processing module 420 for additional processing prior to transmitting the decompressed signal data 410 from the compression module 400 of the baseband unit.

In an additional embodiment, the compression module 400 may be located at one of the remote radio units. In this embodiment, in an uplink mode of operation, signal data 405 to be transmitted to the baseband unit from one or more of the remote radio units may be received from an end user or subscriber. The compression module 400 of the remote radio unit may preprocess the signal data utilizing an upstream data processing module 405. The preprocessed data from the upstream data processing module 405 may then be transmitted to a compressor 425. The compressor 425 may then compress the signal data and provide the compressed signal samples to a downstream data processing module 435 for additional processing prior to transmitting the compressed signal 445 to the baseband unit. In a downlink mode of operation, compressed signal data 450 may be received at one or more of the remote radio units from the baseband unit. An upstream data processing module 440 may preprocess the compressed signal data received from the baseband unit prior to providing the compressed data to the decompressor 430 of the compression module 400. The decompressor 430 may then decompress the compressed signal samples. After decompression, the decompressed signal samples may be provided to a downstream data processing module 420 for additional processing prior to transmitting the decompressed signal data 410 from the compression module 400 of the remote radio unit.

The compressor of the present invention is capable of generating compressed data from multiple stream uncompressed data comprising a plurality of signal streams, as is the case in communication systems employing carrier aggregation. In the present invention, multiple streams of data, each stream associated with one of a plurality of component carriers are received, and compressed, by the compressor. In the present invention, each of the signal streams may be associated with a different wireless protocol, including, but not limited to CDMA (Code Division Multiple Access) and LTE (Long Term Evolution).

Figure 5:
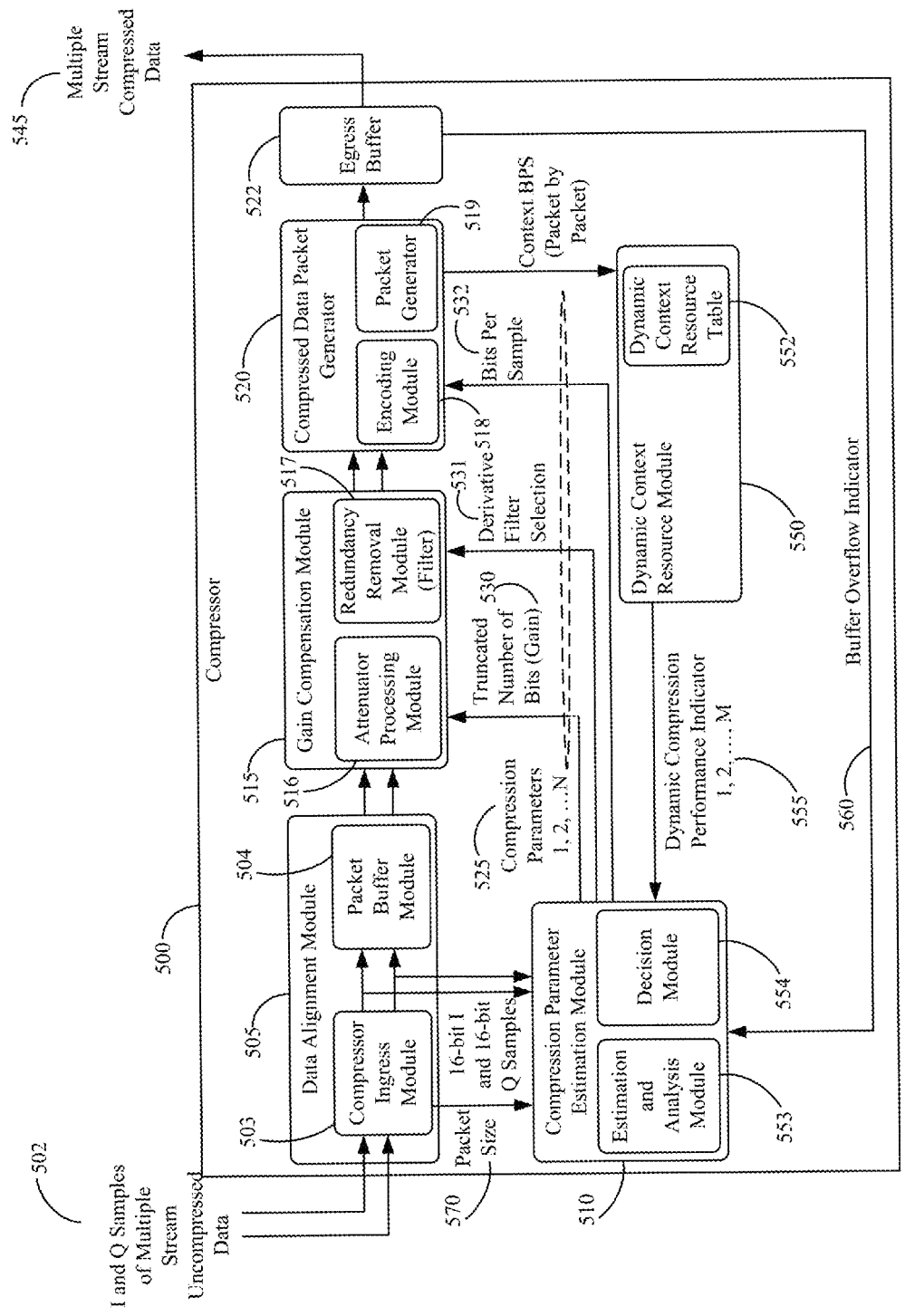
FIG. 5 is a block diagram illustrating a compressor in accordance with an embodiment of the present invention.

With reference to FIG. 5, the compressor 500 in accordance with the present invention combines feedforward processing and feedback processing of the multiple stream uncompressed data 502 to adjust the compression parameters used in the generation of the multiple stream compressed data 545, thereby achieving an average compression ratio with reasonable degradation of the signal while also keeping the latency jitter to a reasonable level. In the present invention, the I and Q samples of the multiple stream uncompressed data 502 includes a plurality of signal streams, each of the plurality of signal streams comprising a plurality of data packets, such that a first data packet of the multiple stream uncompressed data 502 belongs to a first data stream and a second data packet of the multiple stream uncompressed data 502 belongs to a second data stream.

In accordance with the present invention, the compressor 500 includes a data alignment module 505 configured to receive the multiple stream uncompressed data 502. The data alignment module 505 further includes a compressor ingress module 503 and a packet buffer module 504 coupled to the compressor ingress module 503. On ingress, the compressor ingress module 503 receives the samples through two 16-bit data interfaces: one for the In-phase (I) sample and one for the Quadrature-phase (Q) sample 502. If the actual number of bits for the I and Q samples is less than 16 bits, the compressor ingress module 503 extends the most significant bits to 16 bits before forwarding the data to the packet buffer module 504. The compressor ingress module 503 is further configured to calculate a packet size 570 for each of the received packets and to mark the input data with a start of packet (SOP) pulse and an end of packet (EOP) pulse.

The compressor 500 further includes a compression parameter estimation module 510 coupled to the data alignment module 505. The compression parameter estimation module 510 receives the 16-bit I and 16-bit Q samples and the packet size 570 from the compressor ingress module 503. The packet buffer module 504 stores a packet while the compression parameter estimation module 510 estimates the compression parameters 525 for the current packet based on the signal characteristics. The compression parameter estimation module 510 further includes an estimation and analysis module 553 and a decision module 554. The estimation and analysis module 553 receives the 16-bit I and Q samples from the data alignment module 505 and estimates compression parameters that are used by the decision module 554 to calculate a number of bits to be truncated from the samples prior to compression of the samples. As such, the feedforward processing of the compressor 500 is provided by the data alignment module 505 and the compression parameter estimation module 510.

In the present invention, the multiple stream uncompressed data 502 comprises a plurality of signal streams and each of the plurality of signal streams comprises a plurality of data packets. Each of the multiple data streams may be representative of a specific channel associated with a specific antenna-carrier. As such, the multiple stream uncompressed data 502 comprises multiple streams of uncompressed data packets. Each data packet may comprise a header and a data portion or data payload. Each data packet may further comprise information relevant to error checking functions.

The compression parameter estimation module 510 is configured to analyze the plurality of signal streams of the multiple stream uncompressed data 502 to estimate at least one compression parameter 525 associated with each of the plurality of signal streams to be applied to each of the plurality of signal streams during the compression of the multiple stream uncompressed data. In one embodiment, the compression parameter estimation module 510 estimates the compression parameters to be used for each signal stream to obtain a desired compression ratio and acceptable degradation. In a particular embodiment, the compression parameters 525 estimated by the compression parameter estimation module 510 may include a gain parameter 530 indicating the number of bits to be truncated from each of the data packets of each signal stream, a derivative filter selection parameter 531 indicating the filtering scheme for the removal of redundancy during the compression of the data packets of each signal stream and a bits per sample 532 indicating the number of bits per sample to be used in the encoding and packet generation of the compressed data packets of each signal stream. The compression parameters 525 may include, but are not limited to, an estimated signal gain for the data packet, an estimated redundancy removal for the data packet and a desired entropy reduction value for the data packet.

The compressor 500 further includes a gain compensation module 515 coupled to the data alignment module 505 and the compression parameter estimation module 510. The gain compensation module 515 further includes an attenuator processing module 516 and a redundancy removal module 517. The attenuator processing module 516 receives the I and Q samples from the packet buffer module 504 and the truncated number of bits 530 from the compression parameter estimation module 510 and attenuates the I and Q samples to reduce the overall number of bits per sample based on the truncated number of bits 530 received from the compression parameter estimation module 510. The redundancy removal module 517 receives the I and Q samples from the attenuator processing module 516 and the derivative filter selection parameter 531 from the compression parameter estimation module 510 and utilizes the filter identified by the derivative filter selection parameter 531 to eliminate the excess entropy in the data packets without degrading the signal quality.

The compressor 500 further includes a compressed data packet generator 520 coupled to the compression parameter estimation module 510 and configured to compress the multiple stream uncompressed data using the one or more compression parameters associated with each of the plurality of signal streams to generate multiple stream compressed data comprising a plurality of compressed signal streams. The compressed data packet generator 520 further includes an encoding module 518 and a packet generator 519. The compressed data packet generators 520 receives the parallel 16-bit I samples and 16-bit Q samples from the gain compensation module 515 and the bits per sample 532 from the compression parameter estimation module 510 and performs block point encoding of the 16-bit I and 16-bit Q samples. The packet generator 519 receives the encoded I and Q samples from the encoding module 518 and generates multiple stream compressed data from the encoded I and Q samples. The multiple steam compressed data may then be stored in the egress buffer 522 prior to transmission of the multiple stream compressed data 545 from the compressor 500. The egress buffer 522 provides a buffer overflow indicator 560 to the compression parameter estimation module 510. The buffer overflow indicator 560 notifies the compression parameter estimation module 510 that the egress buffer 522 fill level has been exceeded. The compression parameters 525 estimated by the compression parameter estimation module 510 may be adjusted based upon the buffer overflow indicator 560 from the egress buffer 522.

The compressor 500 further includes a dynamic context resource module 550 coupled to the compressed data packet generator 520. The dynamic context resource module 550 is configured to measure a compression performance level of a most recent compressed data packet of each of the plurality of compressed signal streams to generate a signal stream compression performance level for each of the plurality of signal streams The most recent compressed data packet of each of the plurality of compressed signal streams is representative of the current compression performance level for the signal stream. The dynamic context resource module 550 is further coupled to the compression parameter estimation module 510. The dynamic context resource module 550 is configured to calculate one or more dynamic compression performance indicators from each of the measured signal stream compression performance levels and a desired performance level. The dynamic context resource module 550 further includes a dynamic context resource table 552 configured to store each of the one or more dynamic compression performance indicators for each of the most recent compressed data packets of each of the plurality of compressed signal streams.

In one embodiment, the signal stream compression performance level measured by the dynamic context resource module 550 is a number of bits per packet of the most recent compressed data packet and the dynamic compression performance indicator 555 stored in the dynamic context resource table is equal to the number of bits per packet of the most recent compressed data packet.

In an additional embodiment, each of the uncompressed data packets comprises a number of signal samples and the signal stream compression performance level measured by the dynamic context resource module 550 is equal to a number of bits per packet of the most recent compressed data packet. In this embodiment, the dynamic context resource module 550 is further configured to calculate the dynamic compression performance indicator 555 as equal to a ratio of the number of bits per packet of the most recent compressed data packet to the number of signal samples of the uncompressed data packet.

In another embodiment, the signal stream compression performance level measured by the dynamic context resource module 550 is equal to a number of bits per packet of the most recent compressed data packet and the desired performance level is a desired number of bits per packet. In this embodiment, the dynamic context resource module 550 is further configured to calculate the dynamic compression performance indicator 555 as equal to the difference between the number of bits per packet of the most recent compressed data packet and the desired number of bits per packet. In this embodiment, the dynamic compression performance indicator 555 is indicative of the compression jitter or deviation from the desired performance level in bits per packet.

In yet another embodiment, each of the uncompressed data packets comprises a number of signal samples, the signal stream compression performance level measured by the dynamic context resource module 550 is equal to a number of bits per packet of the most recent compressed data packet and the desired performance level is a desired number of bits per packet, the dynamic context resource module 550 is further configured to calculate the dynamic compression performance indicator 555 as equal to a ratio of the difference between the number of bits per packet of the most recent compressed data packet and the desired number bits per packet to the number of signal samples of the uncompressed data packet. In this embodiment, the dynamic compression performance indicator 555 is indicative of the compression jitter or deviation from the desired performance level in bits per sample.

In an exemplary embodiment illustrating the operation of the dynamic context resource module 550, it is assumed that a packet of an uncompressed data packet of the multiple stream uncompressed data 502 received at the compressor 500 includes 256 signal samples and each of the signal samples includes 16 bits. As such, in the exemplary embodiment, the size of an uncompressed data packet is equal to 4096 bits (256×16). It is assumed that the desired compression ratio is 2:1 and therefore, the desired performance level of the compressor is 2048 bits (4096±2).

The dynamic context resource module 550 measures the compression performance level of a most recent compressed data packet of each of the plurality of compressed signal streams generated by the compressed data packet generator 520. In this exemplary embodiment, the performance level of a first signal stream is measured to be 2064 bits. As such, the dynamic context resource module 550 generates a signal stream compression performance level for the first signal stream that is equal to 2064 bits. In this embodiment, the dynamic context resource module 550 would store 2064 in a table entry in the dynamic context resource table 552 for the first signal stream.

In another instance of the exemplary embodiment, the dynamic context resource module 550 calculates the dynamic compression performance indicator 555 to be equal to 8.0625, which is equivalent to a ratio of the number of bits per packet of the most recent compressed data packet to the number of signal samples of the uncompressed data packet at a 1/16 bit precision. The dynamic context resource module 550 would store the value 8.0625 in a table entry in the dynamic context resource table 552 for the first signal stream.

In another instance of the exemplary embodiment, the dynamic context resource module 550 calculates the dynamic compression performance indicator 555 to be equal to 16, which represents the difference between the number of bits per packet of the most recent compressed data packet (2064) and the desired number of bits per packet (2048). The dynamic context resource module 550 would store the value 16 in a table entry in the dynamic context resource table 552 for the first signal stream.

In another instance of the exemplary embodiment, the dynamic context resource module 550 calculates the dynamic compression performance indicator 555 to be equal to 1/16, which represents the ratio of the difference between the number of bits per packet of the most recent compressed data packet (2064) and the desired number of bits per packet (2048) to the number of signal samples of the uncompressed data packet (256). The dynamic context resource module 550 would store the value 1/16 in a table entry in the dynamic context resource table 552 for the first signal stream.

In the exemplary embodiment, the dynamic compression performance indicator 555 indicates an undercompressed signal stream, wherein the actual number of bits per packet is more than the desired number of bits per packet. In an additional embodiment, the dynamic compression performance indicator 555 might indicate an overcompressed signal stream, wherein the actual number of bits per packet is less than the desired number of bits per packet. If this situation, the compression parameters for the signal stream may be adjusted to remove fewer bits during the compression of the next packet of the signal stream.

The compressor 500 further includes a compression parameter estimation module 510 coupled to the dynamic context resource module 550 and configured to read the one or more dynamic compression performance indicators 555 from the dynamic context resource table 552, to determine if each of the plurality of signal streams exhibits the desired performance level based upon the one or more dynamic compression performance indicators 555 read from the dynamic context resource table 552, to adjust the one or more compression parameters 525, 530 associated with each of the signal streams that does not exhibit the desired performance level or to not adjust the one or more compression parameters 525, 530 associated with each of the signal streams that does exhibit the desired performance level. The compressed packet generator 520 is further configured to compress a next data packet of each of the plurality of signal streams based upon the adjusted one or more compression parameters associated with the signal stream or the unadjusted one or more compression parameters associated with the signal stream provided by the compression parameter estimation module 510.

The multiple stream compressed data 545 generated by the compressor 500 is then transmitted via a CPRI link between the baseband unit and one or more of the remote radio units. As previously discussed, the compressor 500 may be located at the baseband unit and/or at one or more of the remote radio units.

Figure 6:
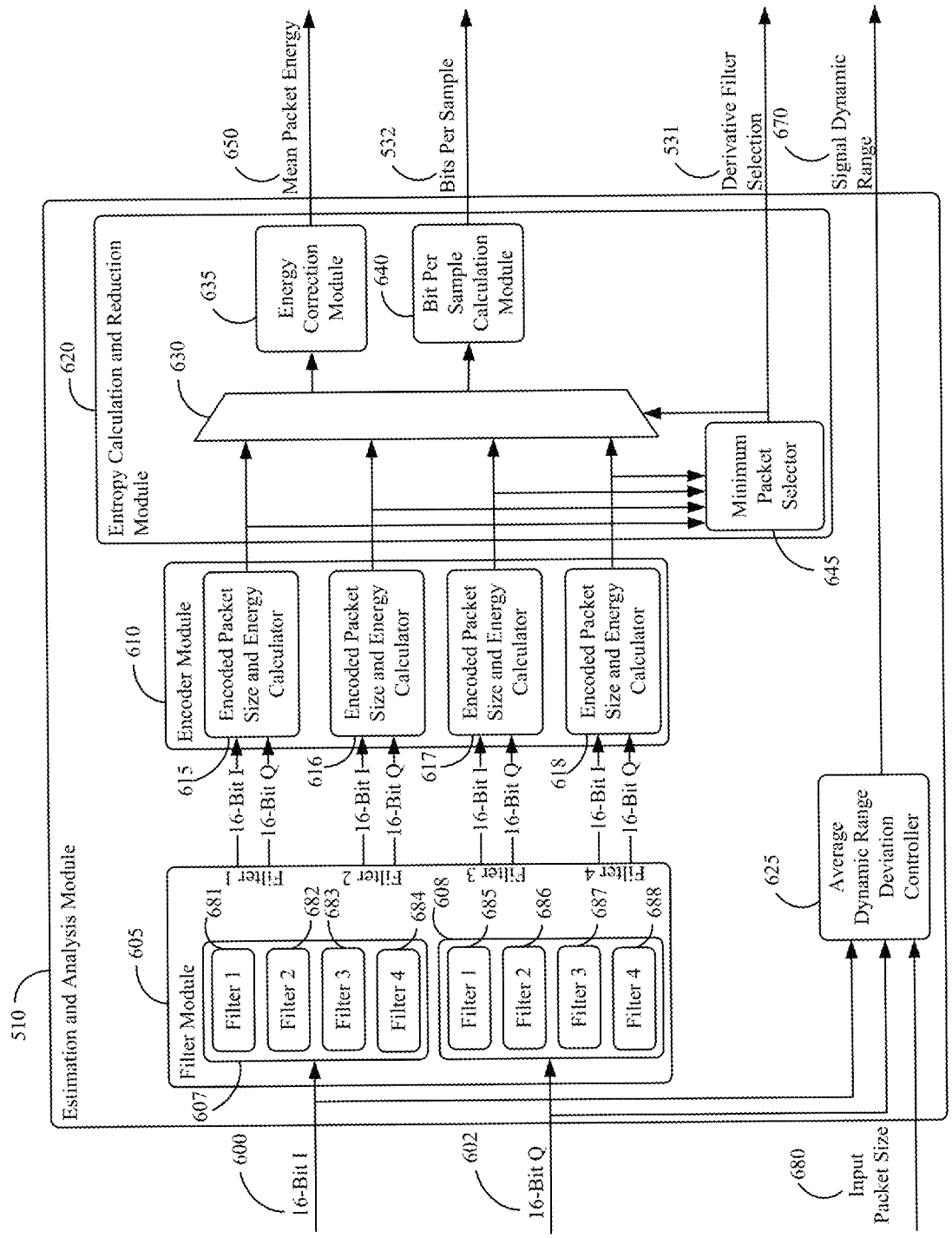
FIG. 6 is a block diagram illustrating a compression parameter estimation module in accordance with an embodiment of the present invention

With reference to FIG. 6, in accordance with an embodiment of the present invention the compression parameter estimation module 510 of the compressor 500 includes a filter module 605, an encoder module 610, an entropy calculation and reduction module 620 and an average dynamic range deviation controller 625. In this specific embodiment, the filter module 605 includes two instantiations of a set of filters 607, 608 and the encoder module 610 includes four instantiations of the encoded packet size and energy calculator 615, 616, 617, 618, however this is not meant to be limiting and greater or fewer instantiations may be included in the filter module 605 and the encoder module 610 of the present invention. Additionally, each of the set of filters 607, 608 further comprises four individual filters, wherein the set of filters 607 for processing the 16-bit I samples includes individual filters 681, 682, 683 and 684 and the set of filters 608 for processing the 16-bit Q samples includes individual filters 685, 686, 687 and 688. Each of the four filters in each of the sets of filters is associated with a different n-th order derivative. In one embodiment, filter 1 681, 685 may be a zero order difference filter, filter 2 682, 686 may be a first derivative difference filter, filter 3 683, 687 may be a third order difference filter and filter 4 684, 688 may be a double difference filter. The 16-bit I samples are processed through each filter 681, 682, 683 and 684 of one filter module 607 and the 16-bit Q samples are processed through each filter 685, 686, 687 and 688 of the other filter module 608. Each of the filtered 16-bit I and Q samples from each of the filters, 681, 682, 683 and 684 for the 16-bit I samples and 685, 686, 687 and 688 for the 16-bit Q samples, are then processed through one of the encoded packet size and energy calculators 615, 616, 617, 618 of the encoder module 610. As such, the present invention establishes a plurality of compression parameter estimations paths for the I and Q samples, each of the compression parameter estimation paths including one of the individual filters, filter 1 681, 685, filter 2 682, 686, filter 3 683, 687 or filter 4 684, 688, and one of the plurality of encoded packet size and energy calculators 615, 616, 617, 618.

Each of the plurality of filters, 681, 682, 683 and 684 or 685, 686, 687 and 688, may be designed to filter the 16-bit I and Q data 600, 602 in accordance with the associated nth-order derivative. After the 16-bit I and Q data 600, 602 is received at the compression parameter estimation module 510, the 16-bit I and Q data 600, 602 may be processed by each of the plurality of compression parameter estimation paths in parallel. The output of each of the plurality of filters may be a plurality of filtered multiple stream uncompressed data signals, each of the resulting filtered uncompressed data signals having a unique filter parameter determinant upon which of the plurality of filters filtered the multiple stream 16-bit I and Q data 600, 602.

Each of the plurality of filtered multiple stream uncompressed data signals may then be provided to one of a plurality of encoded packet size and energy calculators 615, 616, 617, 618, wherein each compression parameter estimation path comprises one of the plurality of encoded packet size and energy calculators 615, 616, 617, 618. Each of the plurality of encoded packet size and energy calculators 615, 616, 617, 618 may be programmed to calculate the encoded packet size and energy for each of the derivative filter paths, 681, 682, 683, 684 or 685, 686, 687 and 688.

The filtered and encoded data from each of the plurality of encoded packet size and energy calculators 615, 616, 617, 618 may then be provided to an entropy calculation and reduction module 620. The entropy calculation and reduction module 620 may be programmed to calculate the entropy of the filtered and encoded data and to reduce the entropy of the data as necessary utilizing one of a plurality of entropy calculation and reduction techniques currently known in the art. The entropy calculation and reduction module 620 further includes a multiplexer 630 coupled to receive the filtered and encoded data from the encoder module 610, an energy correction module 635 coupled to the output of the multiplexer 630, a bit per sample calculation module 640 coupled to the output of the multiplexer 630 and a minimum packet selector 645 coupled to the encoder module 610 and the multiplexer 630. The minimum packet selector 645 receives the calculated encoded packet size and the calculated energy for each of the plurality of compression parameter estimation paths associated with each of the individual filters (filter 1, filter 2, filter 3 and filter 4) from the encoder module 610. The minimum packet selector 645 selects the best compression parameter estimation path that leads to the minimum encoded packet size and provides a derivative filter selection parameter 531 identifying the best compression parameter estimation path for the packet to the multiplexer 630 and to the decision module 554. The multiplexer then selects the best derivative filter path as identified by the minimum packet selector 645 and provides the encoded packet size of the selected path to the bit per sample calculation module 640 and provides the calculated energy of the selected path to the energy correction module 635. The energy correction module 635 determines the mean packet energy 650 for the packet. If the number of samples used for zero padding is larger than certain value (typically larger than 254 16-bit sample) the compressor egress buffer 522 may overflow. The mean packet energy 650 is used to balance the energy in the zero padded samples so that a buffer overflow can be avoided. The bit per sample calculation module 640 determines the bits per sample 532 for the packet. The mean packet energy 650 for the packet and the bits per sample 532 for the packet are provided to the decision module 554. Additionally, the bits per sample 532 for the packet is provided to the compressed data packet generator 520 to be used in the generation of the compressed packets. The estimation and analysis module 510 further includes an average dynamic range deviation controller 625 coupled to receive the 16-bit I samples 600 and 16-bit Q samples 602 and to receive the packet size 570 from the compressor ingress module 503, the average dynamic range deviation controller 625 to automatically detect the signal dynamic range 670 of the 16-bit I and 16-bit Q data and to provide the signal dynamic range 670 to the decision module. The signal dynamic range 670 identifies an optimal bit width of the I and Q samples that represents the smallest bit width that can satisfy a required signal-to-noise ratio while also avoiding overflow.

The estimation and analysis module 510 identifies the compression parameter estimation path that most closely meets the desired performance level of the compressor. In this way, the estimation and analysis module 510 identifies the best compression parameter estimation filter for the current I and Q data packets of the specific signal stream and generates a set of parameters to be used for compression of the packets of the specific signal stream. The estimation and analysis module 510 may then provide the compression parameters associated with the selected filtering to the gain compensation module 515 and the compressed data packet generator 520 as previously described with reference to FIG. 5. The compression parameters provided by the estimation and analysis module 510 may include a derivative filter parameter 531, and a bits per sample 532 parameter. The estimation and analysis module 510 provides these compression parameters to the decision module 554.

Figure 7:
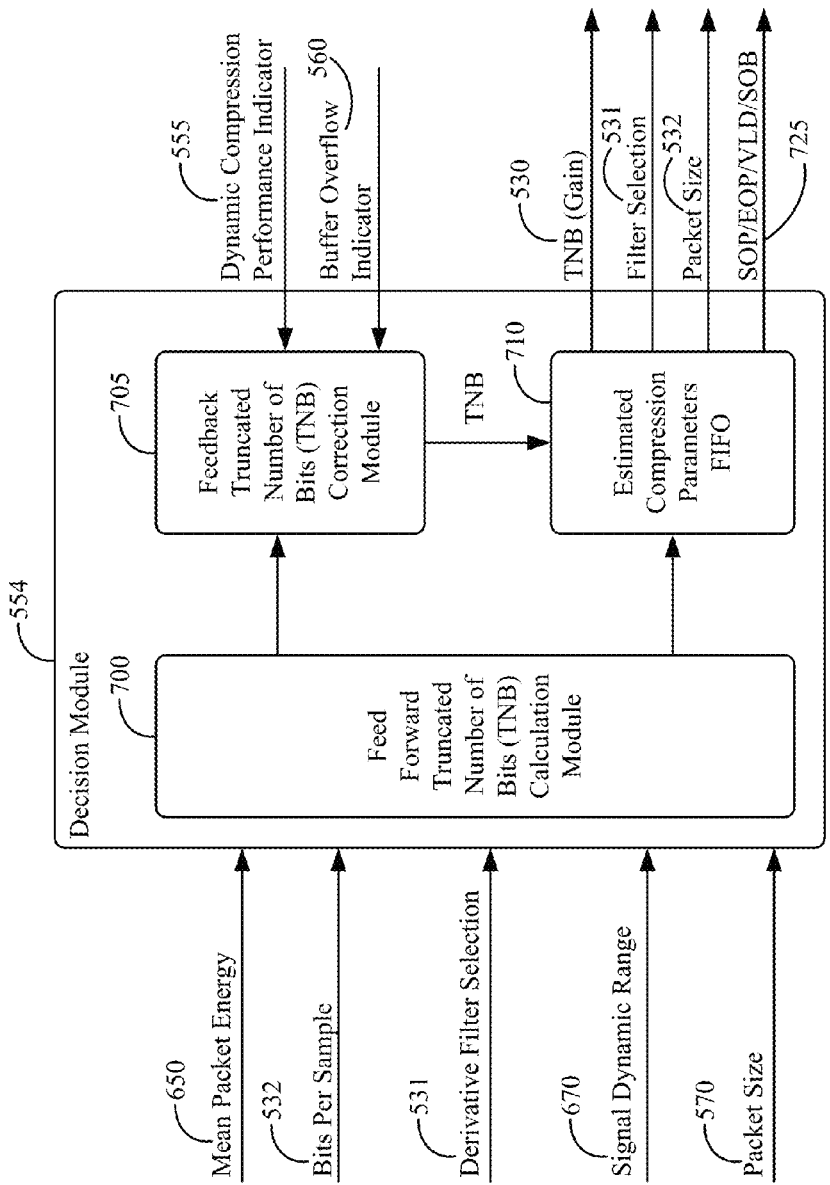
FIG. 7 is a block diagram illustrating a decision module of the compression parameter estimation module in accordance with an embodiment of the present invention.

With reference to FIG. 7, the decision module 554 of the compression parameter estimation module 510 may include a feed forward truncated number of bits (TNB) calculation module 700, a feedback truncated number of bits (TNB) correction module 705 coupled to the feed forward truncated number of bits (TNB) calculation module 700 and an estimated compression parameters FIFO coupled to the feed forward truncated number of bits (TNB) calculation module 700 and the feedback truncated number of bits (TNB) correction module 705. The decision module 554 receives the compression parameters from the estimation and analysis module including the bits per sample 532 and the derivative filter selection 531. Additionally, the decision module 554 receives the mean packet energy 650 and the signal dynamic range 670 and the input packet size 570 from the estimation and analysis module 510. The decision module is responsible for calculating the truncated number of bits 530 to be used in the attenuator processing module 516 based upon the parameters received from the estimation and analysis module 510. As such, the feed forward truncated number of bits (TNB) calculation module 700 receives the mean packet energy 650, the signal dynamic range 670, the input packet size 570, the bits per sample 532 and the derivative filter selection 531 from the estimation and analysis module 510 and calculates the truncated number of bits 530 to be used by the attenuator processing module 516. The feed forward truncated number of bits (TNB) calculation module 700 provides the truncated number of bits 530 to the feedback truncated number of bits (TNB) correction module 705. The feedback truncated number of bits (TNB) correction module 705 also receives the dynamic compression performance indicator 555 from the dynamic context resource module 550 and the buffer overflow indicator 560 from the egress buffer 522. In one embodiment, the dynamic compression performance indicator 555 represents the context bits per sample for one of the plurality of signal streams stored in the dynamic context resource table 552. The feedback truncated number of bits (TNB) correction module 705 adjusts the compression parameters to be used in the compression of the packet of the specific signal stream based upon the received dynamic compression performance indicators 555, as previously described. In a particular embodiment, the feedback truncated number of bits (TNB) correction module 705 adjusts the truncated number of bits 530 to be used in the compression of the packet of the specific signal stream and stores the truncated number of bits 530 in the estimated compression parameter FIFO for use by the gain compensation module 515 in the compression of the signal stream packet. The estimated compression parameters FIFO 710 stores the estimated compression parameters for each of the packets until they are requested by the gain compensation module 515 and the compressed data packet generator 520. The estimated compression parameters include the truncated number of bits 530, the derivative filter selection 531, the bits per sample 532, and various additional parameters 725, including the start of packet (SOP), end of packet (EOP), valid control signal (VLD) and start of burst indicator (SOB).

In a particular embodiment, the decision module 554 may receive a dynamic compression performance indicator 555 from the dynamic context resource module 550 and in response, the compression parameter estimation module 510 is further configured to adjust one or more of the compression parameters if one or more of the signal streams does not exhibit the desired performance level using the at least one dynamic compression performance indicator 555 associated with a most recent compressed data packet that does not exhibit the desired performance level.

In operation of the compression parameter estimation module, the compressor 500 receives multiple stream uncompressed data comprising a plurality of uncompressed signal streams at the compression estimation module 510, each of the plurality of uncompressed signal streams comprising a plurality of uncompressed data packets. The compression estimation module 510 processes each of the uncompressed data packets through a plurality of filters of filter modules 607, 608 to generate a plurality of filtered packets. The plurality of filtered packets are provided to one of the encoded packet size and energy calculators of the encoder module 610 where they are encoded (lossless) and the encoded packet size and energy of the encoded packet are calculated. The minimum packet selector 645 then identifies the encoded filtered packet of the plurality of filtered packets that has the minimum encoded packet size and selects the filter associated with the filtered packet of the plurality of filtered packets having the minimum encoded packet size. The entropy calculation and reduction module then calculates the bits per sample 532 for the encoded filtered packet and the truncated number of bits 530 for the encoded filtered packet. The gain compensation module 515 then attenuates the encoded filtered packet using the truncated number of bits using the selected filter 531 and the compressed data packet generator 520 then compresses each of the encoded filtered packets using the bits per sample 532 to generate a compressed data packet for the specific signal stream. The dynamic context resource module 550 then measures the bits per sample of the compressed data packet and adjusts the truncated number of bits 530 for the specific signal stream if the bits per sample does not meet the desired compression result.

Figure 8:
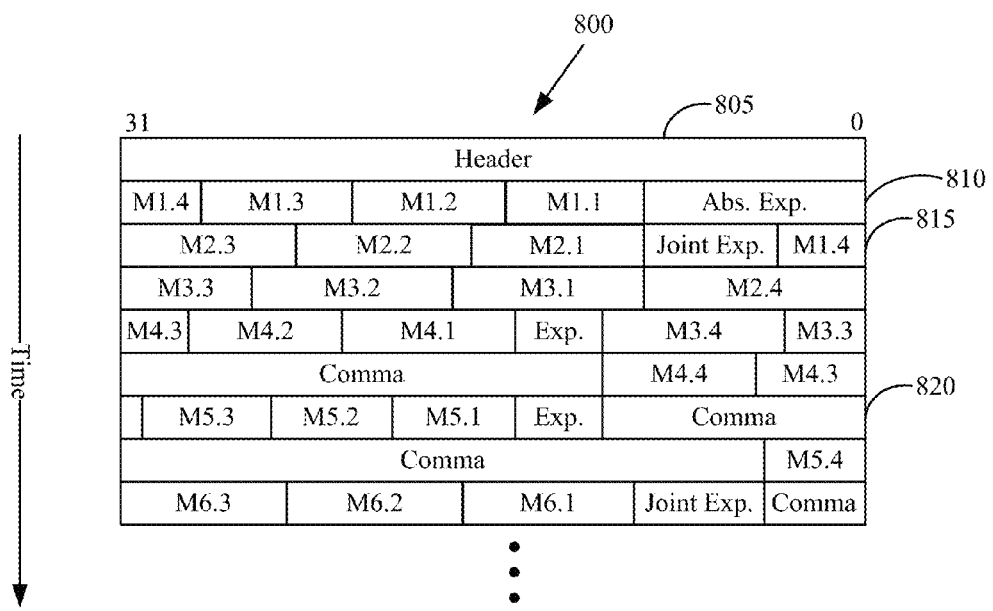
FIG. 8 is diagram illustrating a packet format in accordance with an embodiment of the present invention.

The compressor 500 of the present invention receives the uncompressed multiple stream I and Q samples 502 and provides multiple stream compressed packets 545, each compressed packet comprising a header and compressed samples. The header includes the compression parameters provided by the compression parameter estimation module. A decompressor utilizes the compression parameters provided in the header to decompressor the signal. With reference to FIG. 8, the compressed packet 800 includes a header field 805, a plurality of mantissa 815 (Mx.x denotes mantissa), comma characters 820 (32-bit 0xFFFF_FFFF characters that the compressor sends), and exponents 810 (Abs. Exp., Joint Exp. and Exp.), wherein the exponents 810 define groups of mantissa 815.

The packet header 805 identifies the compression parameters used to compress the packet. With reference to FIG. 9, the packet header format 900 includes a plurality of fields, including a SYNC field 905, a redundancy removal field 910, an attenuation field 915, a start of burst field 920 and a packet size field 925. The SYNC field 905 contains a 12-bit SYNC word that keeps the decompressor in sync with the incoming packets that are generated by the compressor. The redundancy removal order field 910 identifies the filter selection 531 used by the compressor in the compression of the packet. The attenuation field 915 identifies the attenuation factor value for the lossy compression of the packet. The start of burst indicator field 920 indicates whether or not the packet is the start of a burst. The packet size field 925 indicates the number of sample of the packet.

Figure 10:
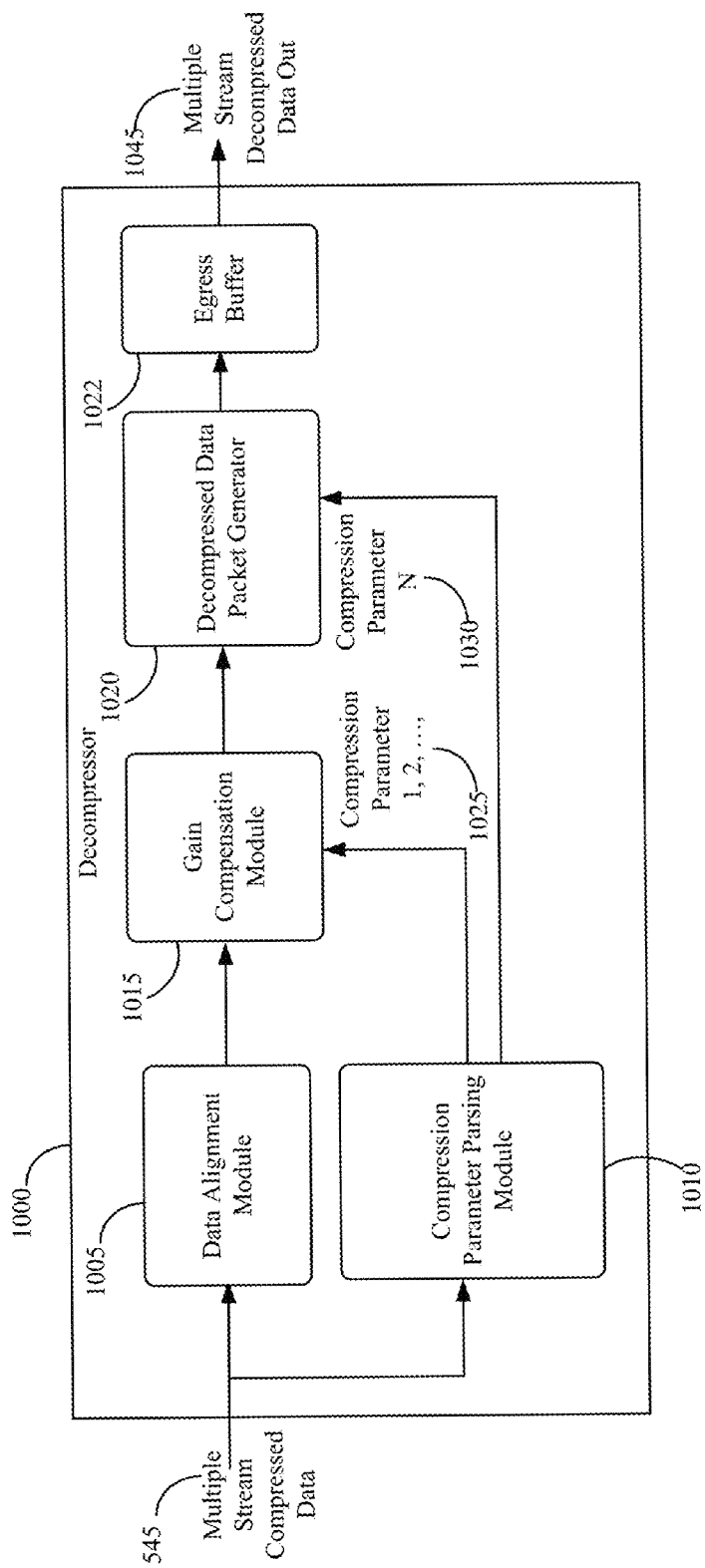
FIG. 10 is a block diagram illustrating a decompressor in accordance with an embodiment of the present invention.

With reference to FIG. 10, upon receipt of multiple stream compressed data 545 via the CPRI link from the compressor 500, a decompressor 1000 may be used to decompress the data packets. In this embodiment, the multiple stream compressed data 545 may be received at a data alignment module 1005 and a compression parameter parsing module 1010. The data alignment module 1005 may be used to identify the alignment of the signal samples within the received multi stream compressed data 545. The compression parameter parsing module 1010 may be used to extract the compression parameters 525 that were previously identified by the compressor 500 and utilized in the compression of the multiple stream compressed data packet. The identified compression parameters may then be utilized by the gain compensation module 1015 and the decompressed data packet generator 1020 during the decompression of the data packets. After the data has been decompressed by the decompressed data packet generator 1020, the multiple stream decompressed data packet may be stored in an egress buffer 1022 prior to transmission of the decompressed data 1045 from the decompressor 1000.

Figure 11:
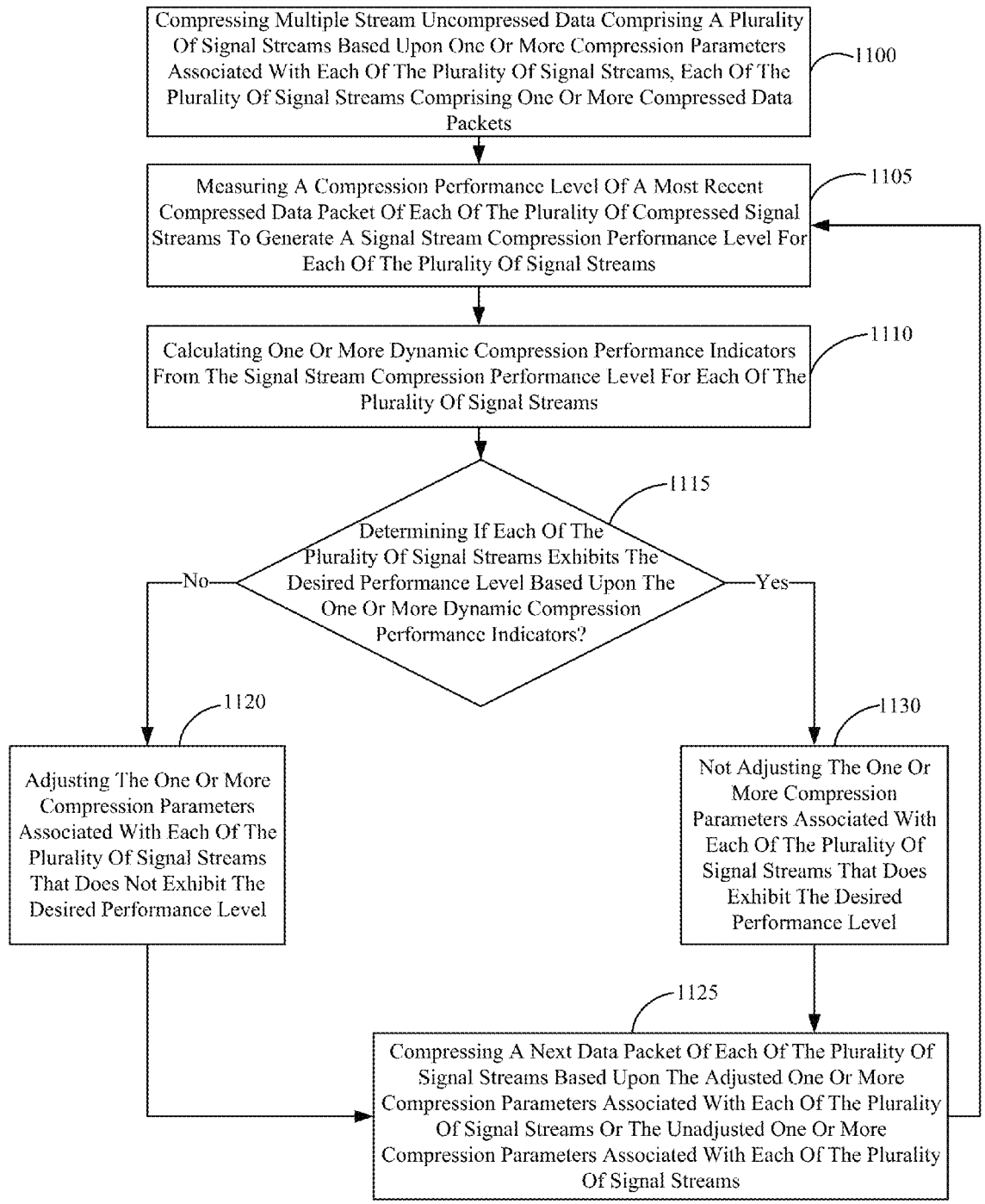
FIG. 11 is a flow diagram illustrating an embodiment of the present invention.

With reference to FIG. 11, a method for compressing data in a communication system is provided, the method includes compressing multiple stream uncompressed data a plurality of signal streams based upon one or more compression parameters associated with each of the plurality of signal streams, each of the plurality of signal streams comprising one or more compressed data packets 1100. In one embodiment, the compression may be performed by the compressed data packet generator 520 of the compressor 500.

The method optionally includes, prior to compressing the multiple stream uncompressed data analyzing the plurality of signal streams of the multiple stream uncompressed data to estimate one or more compression parameter associated with each of the plurality of signal streams to be applied to each of the plurality of signal streams during the compression of the multiple stream uncompressed data 1100. In one embodiment, the compression parameter estimation module 510 of the compressor 500 is configured to analyze the plurality of signal streams of the multiple stream uncompressed data to estimate one or more compression parameter to be applied to each of the plurality of signal streams during the compression of the multiple stream uncompressed data 1100.

In one embodiment, analyzing the plurality of signal streams of the multiple stream uncompressed data to estimate one or more compression parameter to be applied to each of the plurality of signal streams during the compression of the multiple stream uncompressed data 1100 further includes, processing each of the plurality of signal streams through a plurality of compression parameter estimation paths, in parallel, and identifying the compression parameter estimation path of the plurality of compression parameter estimation paths that most closely meets a desired compression result to estimate the at least one compression parameter to be applied during the compression of each of the plurality of signal streams of the multiple stream uncompressed data.

In accordance with one aspect of the present invention, processing each of the plurality of signal streams through a plurality of compression parameter estimation paths, in parallel, further includes filtering each of the plurality of signal streams through each of a plurality of filters, encoding each of the plurality of filtered signal streams using one of a plurality of encoders, calculating entropy and entropy reduction for each of the plurality of filtered, encoded signal streams using one of a plurality of encoded packet size and energy calculators and identifying the combination of filtering, encoding and entropy calculation and entropy reduction that most closely meets a desired compression result to estimate the one or more compression parameter to be applied during the compression of each of the plurality of signal streams of the multiple stream uncompressed data 1100. The compression parameters are specific to each of the plurality of signal streams as determined by the selection of the minimum packet selector 645.

Following the compression of the multiple stream uncompressed data 1100, the method further includes measuring a compression performance level of a most recent compressed data packet of each of the plurality of compressed signal streams to generate a signal stream compression performance level for each of the plurality of signal streams 1105. In one embodiment, measuring a compression performance level of a most recent compressed data packet of each of the plurality of compressed signal streams to generate a signal stream compression performance level for each of the plurality of signal streams 1105 is performed by the dynamic context resource module 550 of the compressor 500.

After the signal stream compression performance level is generated for each of the plurality of signal streams 1105, the method further includes calculating one or more dynamic compression performance indicators from the signal stream compression performance level for each of the plurality of signal streams 1110. In one embodiment, calculating one or more dynamic compression performance indicators from the signal stream compression performance level for each of the plurality of signal streams 1110 is performed by the dynamic context resource module 550 of the compressor 500. The dynamic context resource module 550 may also store the calculated dynamic compression performance indicators in a dynamic context resource table 552 of the dynamic context resource module. In one embodiment, the dynamic compression performance level is equal to the number of bits in the most recent compressed data packet. In an additional embodiment, the dynamic compression performance level is equal to a ratio of the number of bits per packet of the most recent compressed data packet to the number of signal samples of the uncompressed data packet. In another embodiment, the dynamic compression performance level is equal to the difference between the number of bits per packet of the most recent compressed data packet and the desired number of bits per packet. In yet another embodiment, the dynamic compression performance level is equal to a ratio of the difference between the number of bits per packet of the most recent compressed data packet and the desired number bits per packet to the number of signal samples of the uncompressed data packets.

After the dynamic compression performance indicators have been calculated based upon the signal stream compression performance level for each of the plurality of signal streams 1110, the method continues by determining if each of the plurality of signal streams exhibits the desired performance level based upon the one or more dynamic compression performance indicators 1115. In one embodiment, determining if each of the plurality of signal streams exhibits the desired performance level based upon the one or more dynamic compression performance indicators 1115 is performed by the compression parameter estimation module 510 of the compressor 500.

Following determining if each of the plurality of signal streams exhibits the desired performance level based upon the one or more dynamic compression performance indicators 1115, the method continues by adjusting the one or more compression parameters associated with each of the plurality of signal streams that does not exhibit the desired performance level 1120 or not adjusting the one or more compression parameters associated with each of the plurality of signal streams that does exhibit the desired performance level 1130. In one embodiment, adjusting the one or more compression parameters associated with each of the plurality of signal streams that does not exhibit the desired performance level 1120 or not adjusting the one or more compression parameters associated with each of the plurality of signal streams that does exhibit the desired performance level 1130 is performed by the compression parameter estimation module 510.

After the one or more compression parameters have been adjusted 1120 or not adjusted 1130, the method continues by compressing a next data packet of each of the plurality of signal streams based upon the adjusted one or more compression parameters associated with each of the plurality of signal streams or the unadjusted one or more compression parameters associated with each of the plurality of signal streams 1125.

The method of the present invention then continues by repeatedly measuring a compression performance level of a next most recent compressed data packet of each of the plurality of compressed signal streams to generate a signal stream compression performance level for each of the plurality of signal streams 1105, calculating one or more dynamic compression performance indicators from the signal stream compression performance level for each of the plurality of signal streams 1110 and adjusting or not adjusting the one or more compression parameters based upon whether or not the signal streams exhibit the desired performance level.

In an exemplary embodiment, multiple stream uncompressed data is received at a compressor of a communication system, the multiple stream uncompressed data comprising a plurality of signal streams and each signal stream comprises a plurality of data packets. Each of the data packets further comprises a plurality of I,Q signal samples. The plurality of signal streams of the multiple stream uncompressed data are then analyzed to estimate at least one compression parameter to be applied to each of the plurality of signal streams during the compression of the multiple stream uncompressed data. The multiple stream uncompressed data is then compressed using the one or more compression parameters associated with each of the plurality of signal streams to generate multiple stream compressed data comprising a plurality of compressed signal streams.

In determining the desired performance level, if the size of each data packet in the uncompressed signal stream is equal to 256 signal samples and the size of each uncompressed signal sample in the data packet is equal to 16 bits, then the total number of bits in an uncompressed data packet of the signal stream is equal to 4096 bits. Assuming a desired performance level to be a 2:1 compression ratio, in order to achieve this performance level, a data packet of the compressed signal stream would need to have one-half the number of bits of the uncompressed data packet, or 2048 bits (4096/2). The compression ratio may also be expressed as an average number of bits per signal sample. In this exemplary embodiment, for a compression ratio of 2:1, the average number of bits per signal sample is equal to 8 bits (2048 bits/256 bits).

After the multiple stream uncompressed data is compressed, a performance level of a most recent compressed data packet of each of the plurality of compressed signal streams is identified. In this exemplary embodiment, the performance level is based upon the average number of bits per signal sample of the most recent compressed data packet. In accordance with this exemplary embodiment, the average number of bits per signal sample is measured for the most recent compressed data packet of each of the plurality of compressed signal streams and the resulting values are stored in the dynamic context resource table of the dynamic context resource module.

The dynamic context resource module then monitors the values stored in the dynamic context resource table to determine if the most recent compressed data packet of each of the plurality of compressed signal stream exhibits a desired performance level, which in the exemplary embodiment is equal to 8 bits per signal sample. If the dynamic context resource module identifies the size of the most recent compressed data packet of a signal stream to be 2056 bits from the dynamic context resource table, then the desired compression ratio of 2:1 has not been met, because the average number of bits per signal is equal to 8.0625 bits (2056 bits/256 bits at a precision of $\frac{1}{16}$), which is greater than the desired 8 bits per signal sample.

Upon identification by the dynamic context resource module that the most recent compressed data packet of one of the plurality of compressed signal streams does not exhibit the desired performance level, the dynamic context resource module calculates one or more dynamic compression performance indicators for the one signal stream associated with the one compressed data packet that does not exhibit the desired performance level and the compression parameter estimation module adjusts the one or more compression parameters based upon the at least one dynamic compression performance indicator to generate at least one adjusted compression parameter for the one signal stream.

In this exemplary embodiment, the dynamic compression performance indicator adjusts the gain of the at least one compression parameter by identifying a different number of bits to be truncated from the next data packet of the signal stream in accordance with the average bit per signal sample of the most recent compressed data packet of the signal stream. In this embodiment, the compression parameter is adjusted based upon the dynamic compression performance indicator which indicates that the gain should be decreased for this signal stream because the performance level of the most recent compressed data packet is equal to 8.0625 bits per signal sample, which is below the desired performance level of 8 bits per signal sample. After the compression parameter is adjusted based upon the dynamic compression performance indicator, the next data packet of the one signal stream of the multiple stream uncompressed data received at the compressor is compressed using the one or more adjusted compression parameters.

With the system and method of the present invention, multiple stream uncompressed data, as is commonly seen in a communication system employing carrier aggregation, is efficiently compressed. With the present invention, the performance level of the most recent compressed data packet of each of the plurality of signal streams of the multiple stream uncompressed data is monitored to determine if the compression of the signal stream exhibits a desired performance level. If the most recent compressed data packet does not meet the desired performance level, the compression parameters for one or more of the signal streams are adjusted such that the signal streams meet the desired performance level, prior to compression of the next data packet of the signal stream.

By generating one or more compression parameters for each signal stream that are based on the characteristics of the individual signal stream, the method and apparatus of the present invention provides context-based compression that varies in accordance with the characteristics of each individual signal stream. When the characteristics of an individual signal steam changes such that it no longer meets a desired performance level, one or more of the compression parameters for the individual signal stream are adjusted, maintaining compression that takes into account the current characteristics of each individual signal stream.

As is known in the art, the compressor may be implemented in a Field Programmable Gate Array (FPGA), an Application-Specific Integrated Circuit (ASIC) or a variety of other commonly known integrated circuit devices. The implementation of the invention may include both hardware and software components.

The invention claimed is:

1. A system comprising:
a compressed data packet generator configured to compress a plurality of uncompressed signal streams based upon one or more compression parameters associated with each of the plurality of uncompressed signal streams to form a plurality of compressed signal streams;
a dynamic context resource module coupled to the compressed data packet generator and configured to measure a compression performance level of a most recent compressed data packet of each of the plurality of compressed signal streams to generate a signal stream compression performance level for each of the plurality of compressed signal streams, to calculate one or more dynamic compression performance indicators from each of the measured signal stream compression performance levels and a desired performance level; and
a compression parameter estimation module coupled to the dynamic context resource module, the compression parameter estimation module including a plurality of compression parameter estimation paths, operating in parallel, each of the plurality of compression parameter estimation paths comprising a filter and an encoded packet size and energy calculator, the compression parameter estimation module configured to use the plurality of compression parameter estimation paths and the one or more dynamic compression performance indicators to determine one or more adjusted compression parameters if the corresponding compressed signal stream does not exhibit the desired performance level, the one or more adjusted compression parameters applied to the corresponding uncompressed signal stream during the compression of the next uncompressed data packet of the corresponding uncompressed signal stream.

2. The system of claim 1, wherein the signal stream compression performance level is a number of bits per packet of the most recent compressed data packet and the dynamic compression performance indicator is equal to the number of bits per packet of the most recent compressed data packet.

3. The system of claim 1, wherein each of the uncompressed data packets comprises a number of signal samples and wherein the signal stream compression performance level is a number of bits per packet of the most recent compressed data packet, the dynamic context resource module is further configured to calculate the dynamic compression performance indicator as equal to the ratio of the number of bits per packet of the most recent compressed data packet to the number of signal samples of an uncompressed data packet.

4. The system of claim 1, wherein the signal stream compression performance level is a number of bits per packet of the most recent compressed data packet and the desired performance level is a desired number of bits per packet, the dynamic context resource module further configured to calculate the dynamic compression performance indicator as equal to the difference between the number of bits per packet of the most recent compressed data packet and the desired number of bits per packet.

5. The system of claim 1, wherein each of the uncompressed data packets comprises a number of signal samples, the signal stream compression performance level is a number of bits per packet of the most recent compressed data packet and the desired performance level is a desired number of bits per packet, the dynamic context resource module is further configured to calculate the dynamic compression performance indicator as equal to a ratio of the difference between the number of bits per packet of the most recent compressed data packet and the desired number bits per packet to the number of signal samples of the uncompressed data packets.

6. The system of claim 1, wherein the compression parameter estimation module is further configured to analyze the plurality of uncompressed signal streams of the multiple stream uncompressed data to determine the one or more compression parameters associated with each of the plurality of uncompressed signal streams.

7. The system of claim 1, wherein the dynamic context resource module further comprises a dynamic context resource table configured to store each of the one or more dynamic compression performance indicators for each of the most recent compressed data packets of each of the plurality of compressed signal streams.

8. The system of claim 1, wherein the one or more compression parameters are selected from the group consisting of an estimated signal gain for the data packet, an estimated redundancy removal encoding for the data packet and a desired entropy reduction value for the data packet.

9. A method for compression, the method comprising:
receiving a plurality of uncompressed signal streams;
processing each of the plurality of uncompressed signal streams through a plurality of compression parameter estimation paths, in parallel, by:
filtering each of the plurality of uncompressed signal streams through one of a plurality of filters;
encoding each of the plurality of filtered uncompressed signal streams using one of a plurality of encoders; and
calculating an encoded packet size and energy for each of the plurality of filtered, encoded uncompressed signal streams using one of a plurality of encoded packet size and energy calculators;
compressing each of the uncompressed signal streams based upon one or more compression parameters associated with each of the plurality of uncompressed signal streams to form a plurality of compressed signal streams;
measuring a compression performance level of a most recent compressed data packet of each of the plurality of compressed signal streams to generate a signal stream compression performance level for each of the plurality of compressed signal streams;
calculating one or more dynamic compression performance indicators from the compression performance level for each of the plurality of compressed signal streams;
determining if each of the plurality of compressed signal streams exhibits a desired performance level based upon the one or more dynamic compression performance indicators;
adjusting the one or more compression parameters associated with each of the plurality of uncompressed signal streams if the compressed signal stream does not exhibit the desired performance level; and
compressing a next uncompressed data packet of each of the plurality of uncompressed signal streams based upon the adjusted one or more compression parameters associated with each of the uncompressed signal streams if the compressed signal stream does not exhibit the desired performance level.

10. The method of claim 9, further comprising storing the one or more dynamic compression performance indicators in a table.

11. The method of claim 9, wherein the measured compression performance level is a number of bits per packet and wherein calculating one or more dynamic compression performance indicators further comprises calculating the compression performance indicator to be equal to the number of bits per packet.

12. The method of claim 9, wherein the measured compression performance level is a number of bits per packet of the most recent compressed data packet and wherein calculating one or more dynamic compression performance indicators further comprises calculating the dynamic compression performance indicator as equal to a ratio of the number of bits per packet of the most recent compressed data packet to the number of signal samples of an uncompressed data packet.

13. The method of claim 9, wherein the measured compression performance level is a number of bits per packet of the most recent compressed data packet and the desired performance level is a desired number of bits per packet and wherein calculating the one or more dynamic compression performance indicators further comprises calculating the dynamic compression performance indicator as equal to the difference between the number of bits per packet of the most recent compressed data packet and the desired number of bits per packet.

14. The method of claim 9, wherein the measured compression performance level is a number of bits per packet of the most recent compressed data packet and the desired compression performance level is a desired number of bits per packet and wherein calculating the one or more dynamic compression performance indicators further comprises calculating the dynamic compression performance indicator as equal to a ratio of the difference between the number of bits per packet of the most recent compressed data packet and the desired number bits per packet to the number of signal samples of an uncompressed data packet.

15. A method for compression, the method comprising:
receiving a plurality of uncompressed signal streams;
processing each of the uncompressed signal streams in parallel by:
filtering each of the plurality of uncompressed signal streams through one of a plurality of filters;
encoding each of the plurality of filtered uncompressed signal streams using one of a plurality of encoders;
calculating an encoded packet size and energy for each of the plurality of filtered, encoded uncompressed signal streams using one of a plurality of encoded packet size and energy calculators;
identifying the combination of filtering and encoding that most closely meets a desired compression result to estimate one or more compression parameters associated with each of the plurality of uncompressed signal streams, the one or more compression parameters including a compression parameter indicating a selected filter, the number of bits per sample for an encoded filtered packet and the truncated number of bits for the encoded filtered packet;
compressing each of the uncompressed signal streams using the corresponding one or more compression parameters, including the truncated number of bits, the bits per sample and the selected filter, to generate a compressed signal stream comprising a plurality of compressed data packets;
measuring a compression performance level of a most recent compressed data packet of each of the plurality of compressed signal streams to generate a signal stream compression performance level for each of the plurality of compressed signal streams;

calculating one or more dynamic compression performance indicators from the measured compression performance level for each of the plurality of compressed signal streams;

determining if each of the plurality of compressed signal streams exhibits a desired performance level based upon the one or more dynamic compression performance indicators;

adjusting the one or more compression parameters associated with each of the plurality of uncompressed signal streams if the compressed signal stream does not exhibit the desired performance level; and compressing a next uncompressed data packet of each of the plurality of uncompressed signal streams based upon the adjusted one or more compression parameters associated with each of the uncompressed signal streams if the compressed signal stream does not exhibit the desired performance level.

16. A system comprising:

a compressed data packet generator configured to compress a plurality of uncompressed signal streams based upon one or more compression parameters associated with each of the plurality of uncompressed signal streams to form a plurality of compressed signal streams;

a dynamic context resource circuit coupled to the compressed data packet generator and configured to measure a compression performance level of a most recent compressed data packet of each of the plurality of compressed signal streams to generate a signal stream compression performance level for each of the plurality of compressed signal streams, to calculate one or more dynamic compression performance indicators from each of the measured signal stream compression performance levels and a desired performance level; and a compression parameter estimation circuit coupled to the dynamic context resource circuit, the compression parameter estimation circuit including a plurality of compression parameter estimation paths, operating in parallel, each of the plurality of compression parameter estimation paths comprising a filter and an encoded packet size and energy calculator, the compression parameter estimation circuit configured to use the plurality of compression parameter estimation paths and the one or more dynamic compression performance indicators to determine one or more adjusted compression parameters if the corresponding compressed signal stream does not exhibit the desired performance level, the one or more adjusted compression parameters applied to the corresponding uncompressed signal stream during the compression of the next uncompressed data packet of the corresponding uncompressed signal stream.

* * * * *